(12) United States Patent
Flechon

(10) Patent No.: US 6,856,050 B2
(45) Date of Patent: Feb. 15, 2005

(54) RECIPROCATING DEVICE FOR WINDING A YARN IN THE FORM OF A PACKAGE

(75) Inventor: Philippe Flechon, Caluire (FR)

(73) Assignee: Rieter Textile Machinery France, Valence Cedex (FR)

( * ) Notice: Subject to any disclaimer, the term of this patent is extended or adjusted under 35 U.S.C. 154(b) by 0 days.

(21) Appl. No.: 10/728,156

(22) Filed: Dec. 4, 2003

(65) Prior Publication Data

US 2004/0108402 A1 Jun. 10, 2004

Related U.S. Application Data

(63) Continuation of application No. PCT/FR02/01942, filed on Jun. 6, 2002.

(51) Int. Cl.$^7$ ............................................. D01H 13/06
(52) U.S. Cl. ..................................... 310/12; 242/481.2
(58) Field of Search ............................... 310/12, 15, 17, 310/28

(56) References Cited

U.S. PATENT DOCUMENTS

| | | | | |
|---|---|---|---|---|
| 2,964,260 A | | 12/1960 | Edelman et al. ............. | 242/158 |
| 4,346,318 A | * | 8/1982 | Shtrikman .................... | 310/12 |
| 4,868,431 A | | 9/1989 | Karita et al. .................. | 310/12 |
| 4,945,268 A | | 7/1990 | Nihei et al. ................... | 310/12 |
| 6,750,570 B1 | * | 6/2004 | Grehant ........................ | 310/12 |

FOREIGN PATENT DOCUMENTS

| | | | | |
|---|---|---|---|---|
| DE | 44 28 321 A1 | 2/1996 | .......... | H02K/41/03 |
| DE | 196 23 771 A1 | 12/1997 | .......... | B65H/54/28 |
| EP | 0 905 869 A2 | 3/1999 | .......... | H02K/41/03 |
| EP | 0 924 843 A1 | 6/1999 | .......... | H02K/37/12 |
| EP | 0 967 316 A2 | 12/1999 | .......... | D05B/69/10 |
| JP | 57052365 | 3/1982 | .......... | H02K/41/03 |
| JP | 58033964 | 2/1983 | .......... | H02K/41/03 |

* cited by examiner

*Primary Examiner*—Thanh Lam
*Assistant Examiner*—Judson H. Jones
(74) *Attorney, Agent, or Firm*—Heslin Rothenburg Farley & Mesiti P.C.

(57) ABSTRACT

A device for winding, at high speed, a yarn onto a rotating support comprises a yarn delivery system, displaced so as to undergo a to-and-fro movement parallel to the surface of said support with rapid deceleration and acceleration at the point of reversal of the to-and-fro movement. A depositing yarn guide of the delivery system is displaced by means of a moving element or cursor associated with a magnetized plate of a linear motor, supplied with two-phase or three-phase current. The stator is formed by at least one assembly of elementary modules placed either face to face or placed so that each lies in the extension of another, each having a plurality of C-shaped magnetic circuits that define, between the ends of their separated legs, an airgap inside which the magnetized plate is positioned, comprising an alternation of North and South poles (N and S), which constitutes the moving element that displaces the cursor carrying the yarn guide.

18 Claims, 21 Drawing Sheets

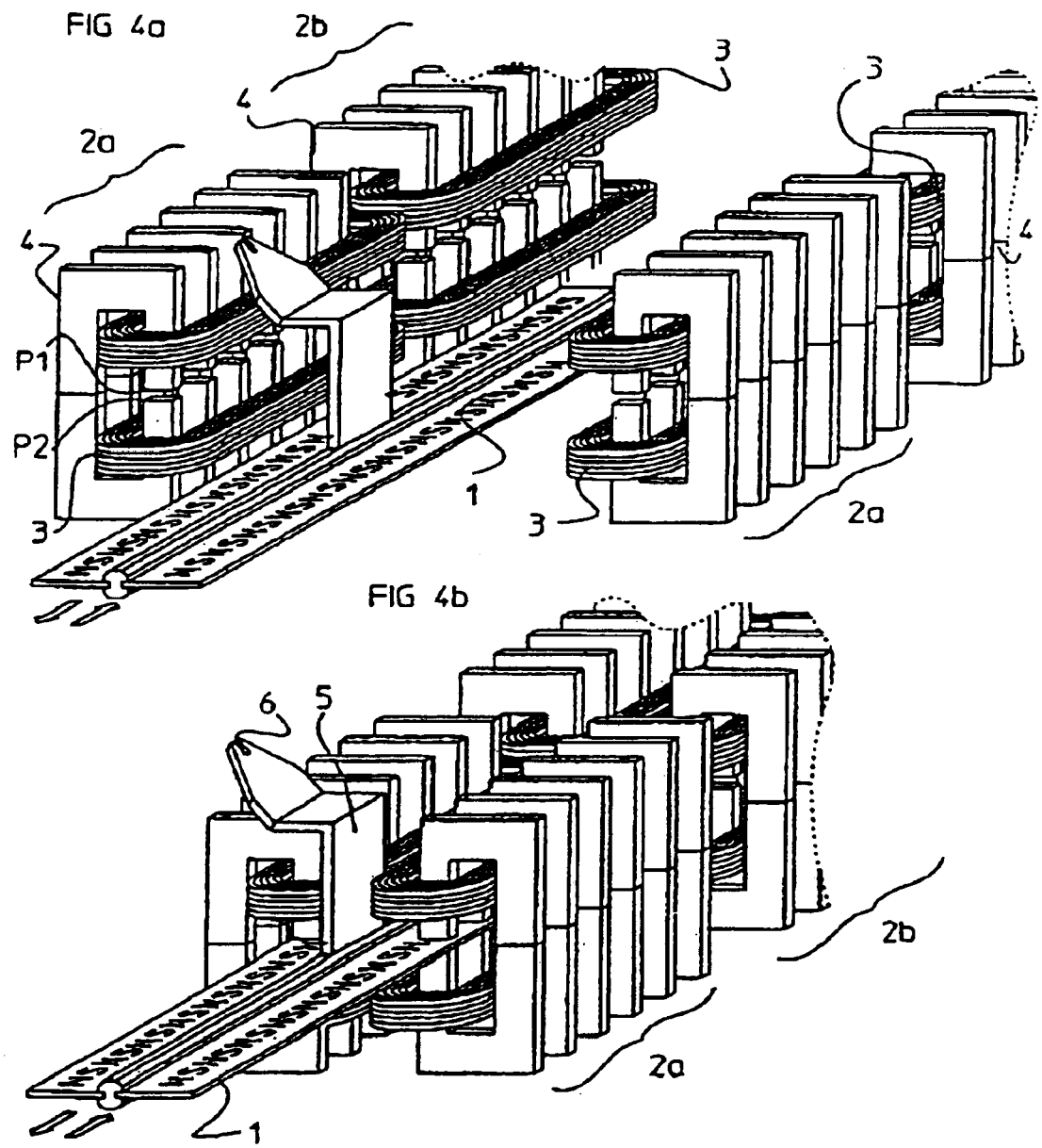

1/2 of the step

1/2 magnetic step

RECIPROCATING DEVICE FOR WINDING A YARN IN THE FORM OF A PACKAGE

CROSS REFERENCE TO RELATED APPLICATIONS

This application is a continuation of International Application PCT/FR02/01942 filed on Jun. 6, 2002 and published as WO/02/098777 A1 on Dec. 12, 2002, and claims priority of French Patent Application No. 01.07428 filed on Jun. 7, 2001 and French Patent Application No. 01.09664 filed on Jul. 19, 2001, all of which are incorporated by reference in their entirety herein.

TECHNICAL FIELD

The present invention relates to the field of the winding of a textile yarn onto a support so as to form a package during various steps involved in its production (spinning, drawing, texturing or any other operation), which involves winding the yarn onto a support (cardboard tube, metal tube, etc.), said support being driven either via its spindle or by pressure on a drive member.

To carry out such an operation, the yarn is distributed along a generatrix over the length of the package, either in the form of parallel straight turns or in the form of undulated turns, which are parallel in any one layer but are offset and crossed from one layer to another.

In general, the speed of displacement along the package is constant, the reversal of the movement at the ends of the package being, however, carried out as rapidly as possible so that the edges of the package are not thicker than the center of the wound package as a result of greater yarn deposition.

This rapid reversal in the direction of displacement therefore produces, on a yarn guide moved in a to-and-fro movement, very high accelerations and decelerations at the point of reversal.

PRIOR ART

Very many proposals have been made for producing reciprocating systems for delivering the yarn onto the surface of the support at the highest possible speed, possibly up to 1000 to 2000 m/min or higher, while at the same time obtaining packages that are of perfect density over their entire thickness and may have either straight sides or have inclined lateral sides (biconical packages).

To effect the displacements of the yarn guide, it has been proposed to use grooved-drum cam systems for mounting the yarn guide on a reciprocating system having a belt driven by a stepper motor controlled by a microprocessor (EP 302 461).

In all the prior solutions in which the yarn guide is mounted on a transmission element (belt, pivoting support, etc.) driven by a motor, one of the main problems that arise is that of the very high instantaneous power peaks, of the order of several hundred watts, that it is necessary to deliver in the region of reversal of the direction of displacement of the guide because of the moving masses.

It has been envisioned to effect the displacements of the guide by direct use of a linear motor, which therefore drives the reciprocating device for depositing the yarn on the package, for example motors of the type of those used in robotics, in the printing sector, or the metrology sector for measurement tables.

In general, these conventional motors may be put into two broad categories.

The first of these categories is formed by linear-type motors with a carriage or cursor, that is to say a motor that operates in a manner similar to a stepper motor opened out flat.

It has therefore been envisioned to mount the yarn delivery assembly directly on this carriage or cursor. However, in such a case, the motor must be designed to allow a total travel at least equal to the useful travel of the moving element, which is therefore formed by coils, whereas the stator is formed by a permanent magnet.

In addition, the attraction between the stator (magnet) and the on-board circuit is extremely high, which would therefore require a translational guiding system capable of withstanding this attraction, while maintaining a constant airgap.

Consequently, the cursor carrying the yarn delivery element would therefore have to be mounted on a carriage associated with the moving coils, which would involve guiding means such as bearing balls or rollers, therefore creating a large moving mass and limiting the acceleration performance of the system.

Finally, if such a solution were to be adopted, the problem would arise of how to supply electricity to the moving coils via electrical wires, which would require the use of flexible cables or of cable-carrying chains, further increasing the moving mass and limiting the accelerations.

The second category of conventional linear motors is that of what are called "tubular" motors.

Such a type of tube motor is produced in such a way that the coils and the magnetic systems are fixed, the permanent magnet itself being able to be moved.

This permanent magnet is cylindrical and can be likened to the piston or the rod of a cylinder actuator.

In such a case, one would therefore envision placing the yarn guide on the end of the cylinder actuator.

In its design, such a linear motor with a moving permanent magnet therefore consists of a tube of material magnetized in a succession of alternating North-South poles. The coils and the associated magnetic forces are arranged as a stack of rings around this tube in the body of the motor.

On account of the fact that in such a type of motor it is only the magnet that moves, the moving masses are therefore reduced and the acceleration performance is improved. It can also be very easily integrated into mechanical set-ups instead of cylinder actuators.

However, the application of such motors to the winding of textile yarns, and which would therefore provide the alternating displacement of the reciprocating guide, would have a major drawback, which is that the presence of the cylinder actuator and its lateral bulk would prevent the winding heads being placed side by side, as is often the case on textile machines.

In addition, even if the moving masses are reduced, they still remain high since the tube magnet must have at least the length of the winding travel plus a sufficient length that remains within the body of the cylinder actuator in order to take the magnetic forces.

This is because, at the end of travel, if the magnet leaves the magnetic field, the motor has less force at the moment when, in the case of winding a yarn, there is need for the maximum force in order to rapidly reverse the movement.

In other words, to have a force that is constant over its entire travel, this type of cylinder actuator must have a permanent magnet whose length is at least equal to twice the travel.

The prior art may be illustrated by the teaching of document DE-A-19623771 relating to a device for the high-speed winding of a filter onto a rotating support and comprising a delivery system displaced so as to undergo a to-and-fro movement parallel to the surface of said support with rapid deceleration and acceleration at the point of reversal of the to-and-fro movement. The depositing yarn guide is displaced by means of a cursor associated with a magnetized plate and a linear motor.

Mention may also be made of the teaching of document U.S. Pat. No. 4,945,268 which describes a linear motor in which the stator is formed by an assembly of elementary modules placed beside one another. A magnetized plate is enclosed and the posts are associated with a single coil in order to form a magnetic field.

In document EP-A-0 905 869, the magnetic circuits have no coils.

SUMMARY OF THE INVENTION

We have found, and it is this that forms the subject of the present invention, an improved device for winding, at high speed, a yarn onto a rotating support and comprising a yarn delivery system displaced so as to undergo a to-and-fro movement parallel to the surface of said support, with rapid deceleration and acceleration at the point of reversal of the to-and-fro movement.

The e depositing yarn guide is displaced by means of a moving element or cursor associated with a magnetized plate of a linear motor, supplied with two-phase or three-phase current.

According to the invention, the stator of the linear motor is formed by at least one assembly of elementary modules placed either face to face or placed so that each lies in the extension of another, each having a plurality of C-shaped magnetic circuits that define, between the ends of their separated legs, an airgap inside which the magnetized plate is positioned, comprising an alternation of North and South poles, which constitutes the moving element that displaces the cursor carrying the yarn guide and in which:

- the magnetic circuits of each elementary module are formed by a plurality of pairs of posts placed opposite each other in each pair, each series of posts being associated with a coil in order to form a magnetic field in the airgap that they define, the spacing between two consecutive posts corresponding to twice the distance between two consecutive North/South poles provided on the flat magnet;
- the posts of a module that are connected to one and the same phase of the electrical supply are offset relative to the posts that are connected to the other phase or other phases by a value corresponding to the magnetic step divided by the number of phases;
- the magnetized plate has dimensions enabling it to be inserted into the airgap of at least one elementary module of each of the supply phases, especially a length in order to cover two aligned modules (with a two-phase supply) or three aligned modules (with a three-phase supply), or especially a width in order to cover two modules (with a two-phase supply) that are placed facing each other, said plate comprising, on these two phases, an alternation of North/South poles spaced apart by a distance corresponding to at least the half-distance lying between two consecutive posts; and
- means are provided for keeping the magnetized plate strictly in the mid-plane of the airgap of the magnetic circuit.

According to the invention, the electrical supply may be either a two-phase current supply or a three-phase current supply.

When the supply is a two-phase current supply, the device comprises at least three aligned elementary modules, the posts of the central module being offset by a one half of the magnetic step, on the same side, relative to the posts of the module that it precedes and of the following module which is associated therewith.

Alternatively, the device comprises at least one pair of two modules facing each other, connected to each of the two phases respectively, the posts of one of the modules being offset by one half of the magnetic step relative to the posts of the module that faces it.

According to the invention, it is possible to produce a linear motor of any travel length using several modules that are aligned or face one another. In this case, all the modules connected to any one phase are placed in such a way that their posts are spaced apart by an integral number of pairs of magnetic steps and therefore in such a way that, whatever the position of the magnet, their posts are facing a pole of the same sign. Likewise, all the modules connected to the other phase are placed in such a way that their posts are spaced apart by an integral number of pairs of magnetic steps, and therefore in such a way that, whatever the position of the magnet, their posts are facing a pole of the same sign, and in such a way that they are all offset by one half of the magnetic step and in the same direction relative to the posts of the modules connected to the first phase.

According to the invention, all the modules connected to any one phase may be aligned on the same side of the magnet, or on either side of the latter.

When the electrical supply is a three-phase current supply, the device comprises at least four aligned elementary modules, the posts of the second module being offset by one third of the magnetic step and on the same side relative to the posts of the preceding module, the posts of the third module being offset by one third of the magnetic step relative to the posts of the second module.

According to the invention, the C-shaped magnetic circuits of each elementary module may be produced either in a one-piece assembly by machining or molding hollowed-out notches in order to define consecutive posts placed in pairs opposite each other and defining an airgap between them, or by a succession of C-shaped plates separated from one another.

Advantageously, the elementary modules constituting the device according to the invention are identical, the offset by one half of the magnetic step or by one third of the magnetic step of the posts of one module relative to the posts of preceding module being obtained by the positioning of the elementary modules relative to one another.

The plate is kept strictly mounted in the mid-plane of the airgap of the magnetic circuit by means for guiding the cursor carrying the yarn guide, which means keep the magnetized plate in position in the airgap of the stators and oppose the attractive forces between the magnets and the poles of the magnetic circuit.

These guiding means may be formed by sets of rollers placed on the cursor, which rollers run along guides that extend over the entire length of the delivery system.

Although the device according to the invention may possibly be constructed so as to comprise only a series of aligned elementary modules, according to a first preferred embodiment, a second set of stators is placed symmetrically with respect to a central plane of symmetry, thereby making it possible to obtain a higher force and one that is perfectly balanced with respect to the central axis of the magnetized plate that can move in the airgap of the magnetic circuits.

In this preferred embodiment, the device therefore comprises two stators consisting of aligned elementary modules, said stators being mounted symmetrically on either side of a central plane of symmetry, the magnetized plate, which constitutes the moving element that moves the cursor supporting the yarn guide, having, placed symmetrically with respect to its longitudinal axis, on both its faces and in the region located in the airgap of the posts, an alternation of North and South poles that are placed in correspondence, the yarn guide element being mounted on the cursor which is itself fixed to a central reinforcement lying in the mid-plane of the magnetized plate between the two series of magnetic poles.

In this case, the elementary modules are also identical and the offset by one half of the magnetic step or one third of the magnetic step of the posts of one module relative to the posts of the preceding module and of the following modules that are associated with it are also obtained by a spacing between two consecutive modules.

The number of modular elements for driving the yarn guide will depend on the length of the package to be produced.

If the device is formed from a series of aligned modules, then the minimum number of modules is three when the power supply is a two-phase supply and four when the power supply is a three-phase supply. The amplitude of the displacement, and therefore the width of the package, is therefore equal to at least the width of one of the modules.

In other words, with a succession of "n" consecutive modules, the device according to the invention makes it possible to obtain a depositing amplitude equal to (n-2) with a two-phase supply or (n-3) with a three-phase supply, multiplied by the width of each module constituting the stator.

If the device is formed from a series of pairs of facing modules, the minimum number of offset pairs is two and the amplitude of displacement is equal to at least the width of one of the modules.

In other words, with a succession of "n" pairs of modules, a laying amplitude of "n-1" multiplied by the width of each module is obtained.

According to another embodiment of the invention, all the modules may be placed so as to face one another and in alignment without any offset, the magnetized plate then having, on either side of its axis of symmetry, an alternation of North/South poles offset by one half of the magnetic step, and in this case all the modules located on one and the same side of the magnet are connected to the same phase.

In this preferred embodiment, the device therefore comprises two stators consisting of aligned elementary modules, said stators being mounted on either side of a central plane of symmetry and the number of modular elements for driving the yarn guide will depend on the length of the package to be produced.

To obtain the maximum couple, the entire magnetized plate must be immersed in the magnetic fields created in the airgap of the modules. Consequently, for an alignment of n pairs of modules placed facing one another, the amplitude of the displacement, and therefore the width of the package, is therefore equal to n times the width of a module less the length of the magnetized plate.

Furthermore, to command and control the reversal of the to-and-fro direction, means for detecting the position of the cursor supporting the yarn guide are associated with the assembly according to the invention, such detection means possibly being formed by an electric cell, or a mirror associated with a laser sensor. Preferably, such means are formed by one or more sensors based on a Hall-effect probe.

BRIEF DESCRIPTION OF THE DRAWINGS

The invention and the advantages that it provides will, however, be more clearly understood from the description that follows, this being illustrated by the appended drawings, in which:

FIGS. 4a and 4b show in detail the general concept of a reciprocating mechanism for depositing the yarn produced according to the invention;

MANNER OF REALIZING THE INVENTION

FIGS. 1a, 1b, 1c and 2, and 15a, 15b, 15c and 16 illustrate, in general, the design of a linear stepper motor capable of being used to provide the to-and-fro displacement of a guide necessary for depositing a yarn on a support (package).

The principle of the linear motor used to produce a device according to the invention is similar to the operation of motors called "stepper" motors, and the permanent-magnet rotor of which is in the form of a disk.

Such a type of rotary stepper motor is disclosed for example by the teachings of patent U.S. Pat. No. 4,330,727.

To produce a device according to the invention, such a rotary motor is transformed, as is apparent from FIGS. 1a, 1b, 1c and 2, into a linear motor in which the rotary disk is therefore replaced by a straight plate (1) having, on each of its faces, two series of magnetic poles of alternating North/South (N/S) polarity. The stator of the rotary motor is therefore unrolled and therefore comprises two stator elements (2a, 2b) each comprising several elementary magnetic circuits (4) obtained by means of coils (3) associated with each series of posts (P1, P2).

In the rest of the description, these posts (P1, P2) will be assigned an index a, b so as to differentiate the two elementary modules, the posts of which are therefore offset relative to the North and South poles, which modules are needed to produce an assembly according to the invention.

In the embodiment illustrated, each of the elementary magnetic circuits (4) has an airgap and all the airgaps are formed at the same distance from the mid-plane in which the moving plate (1) is placed, which plate therefore has an alternation of North/South poles (N/S) at its surface.

Figure 3:
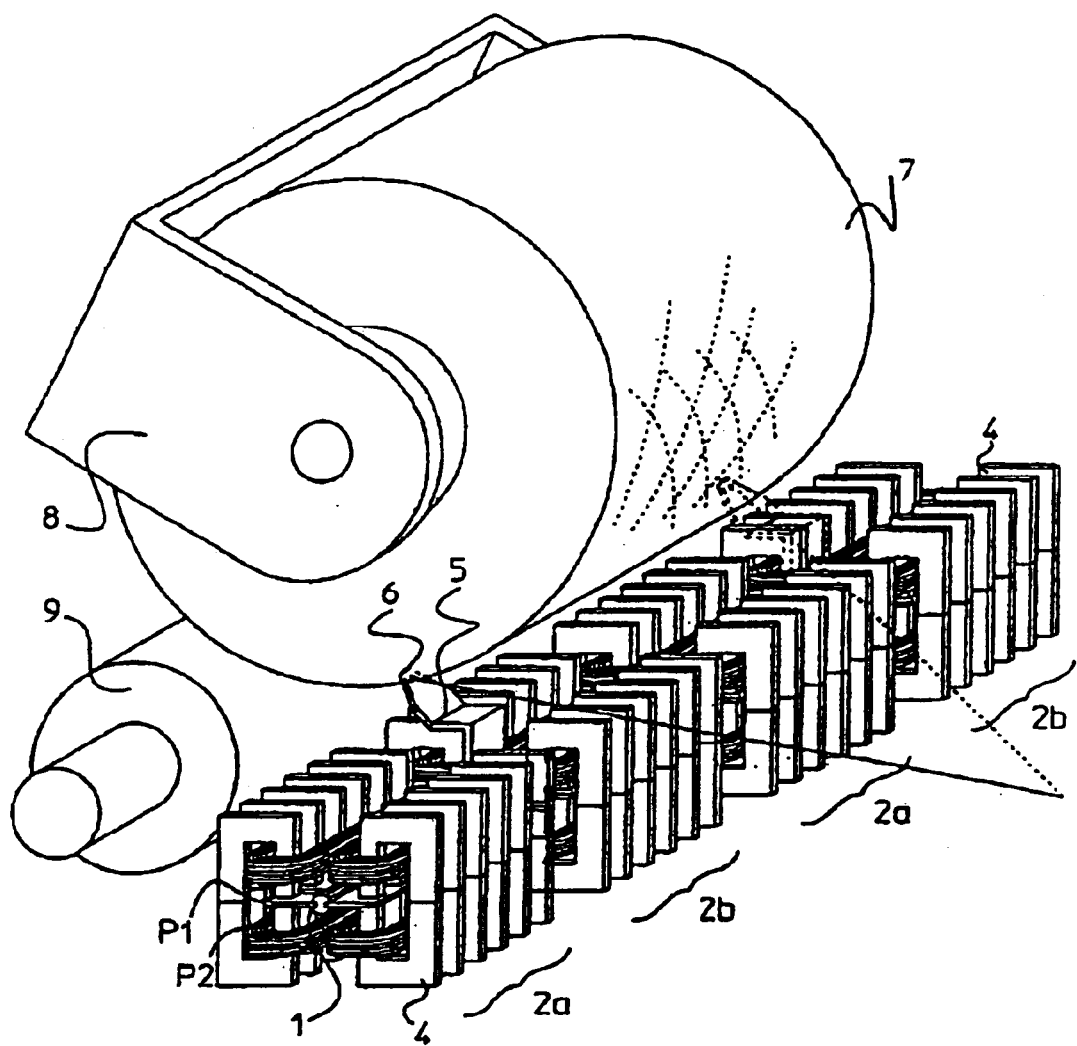
FIG. 3 illustrates a general view of a yarn winding system equipped with a reciprocating system operated by a linear stepper motor for displacing the depositing yarn guide.

To produce a linear motor, the operation of which is therefore similar to a stepper motor whose permanent-magnet rotor is in the form of a disk, and to displace a yarn guide undergoing a to-and-fro movement, such a motor must be formed, in a first embodiment, from at least three elementary modules (2a, 2b, 2a) aligned side by side, FIG. 3 showing one example with four modules (2a, 2b, 2a, 2b).

This FIG. 3 is a general view of the operation of such a linear motor in its preferred embodiment, and which therefore displaces a cursor (5) that has a guide (6) for depositing a yarn so as to form a package (7) mounted on a support carried by a winding system (8) of a textile machine, this package (7) bearing against a drive cylinder (9).

To displace the cursor, such a linear motor is therefore designed in such a way that it comprises at least three elementary modules (2ab, 2b, 2a), the posts (P1a, P2a) of the modules (2a) being offset by one half of the magnetic step relative to the posts (P1b, P2b) of the modules (2b).

As is apparent from this FIG. 3, and also from FIGS. 4a, 4b and 4c, the linear motor according to the invention comprises two identical circuits mounted face to face, the plate (1) supporting the yarn guide element (5, 6) therefore being displaced in the airgap of the these two magnetic circuits.

In another embodiment, to produce a linear motor whose operation is therefore similar to a stepper motor whose permanent-magnet rotor is in the form of a disk, and to displace a yarn guide undergoing a to-and-fro movement, such a motor must consist of at least two elementary modules (2a, 2b) placed facing each other. To obtain the desired total travel, several pairs of modules are aligned in one of the arrangements (FIG. 17 or 18).

Figure 17:
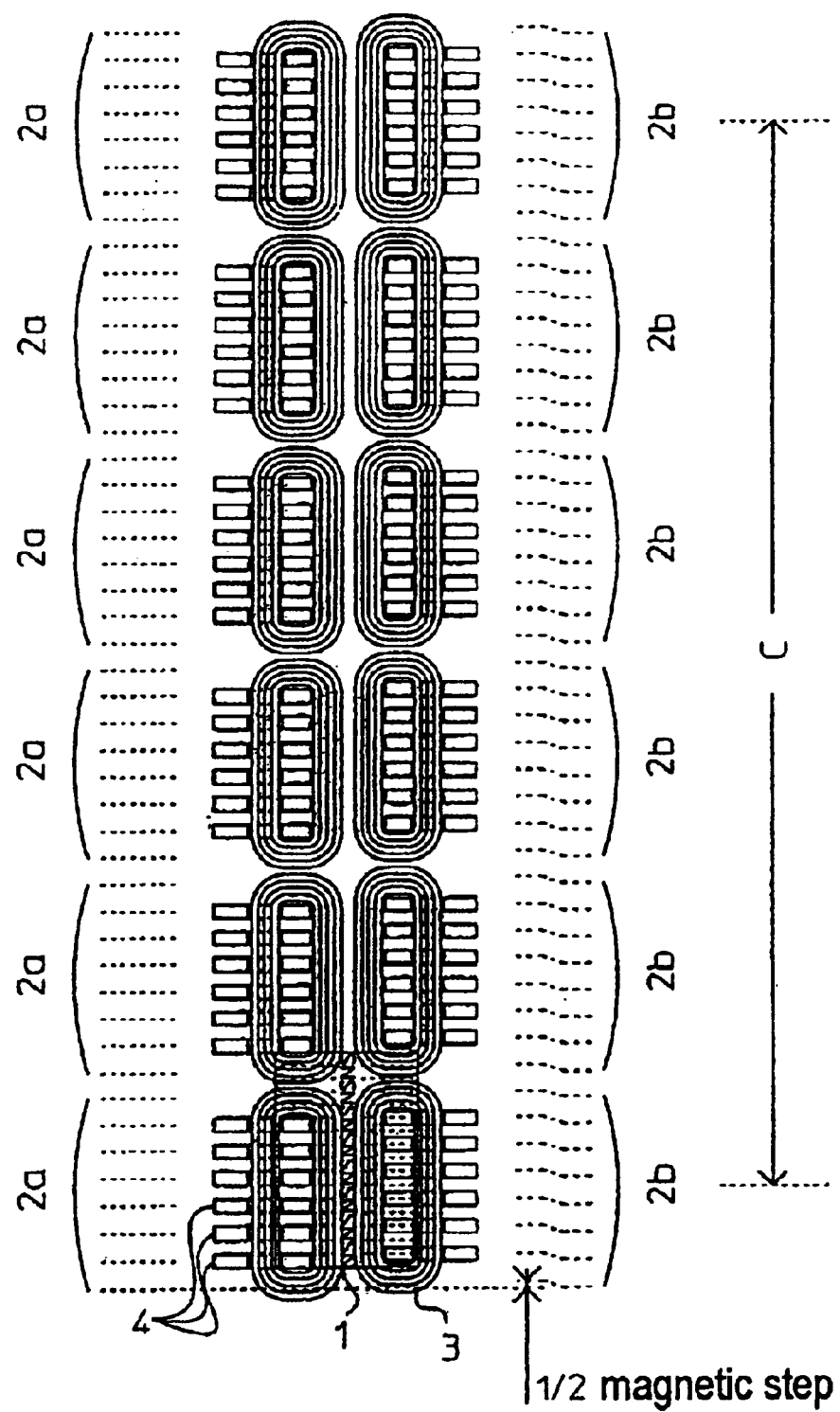
FIG. 17 is a top view illustrating a device according to FIGS. 15a, 15b, 15c and 16, comprising six pairs of facing modules.

FIG. 17 shows an example with six pairs of modules (2a, 2b) in which all the modules (2a) are placed on the same side of the magnet and all the modules (2b) are placed on the other side of the magnet and are offset in the same direction (here towards the top) of one half of the magnetic step.

Figure 18:
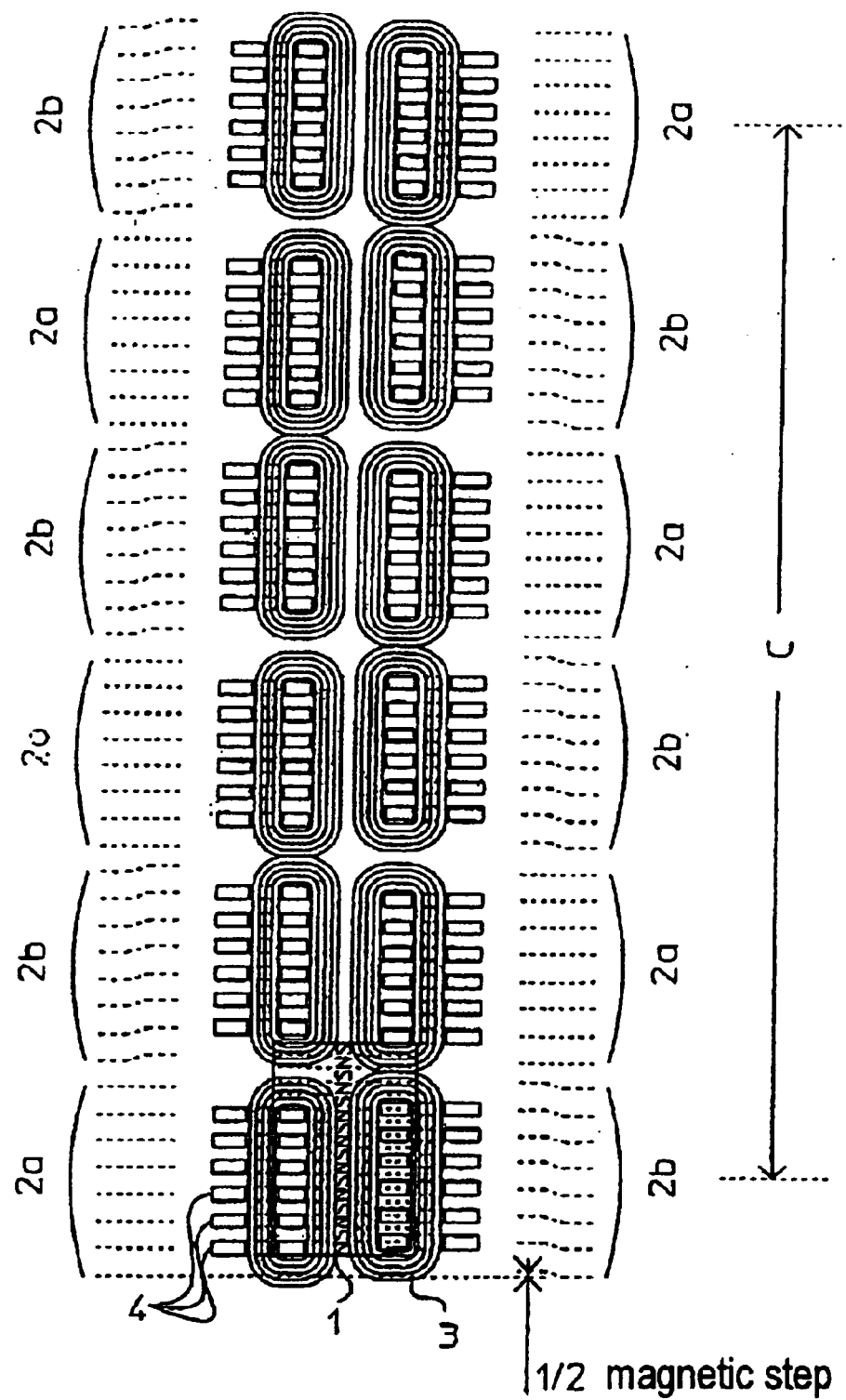
FIG. 18 illustrates an alternative form of FIG. 17, also comprising six pairs of modules.
Figure 19A:
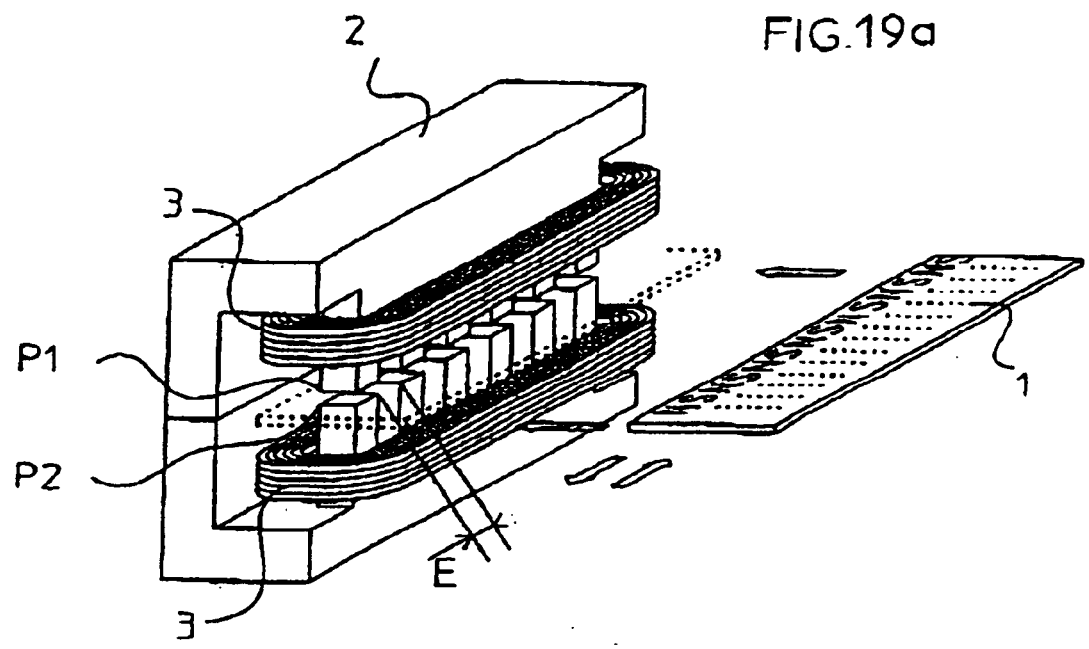
FIGS. 19a and 19b are perspective views showing two embodiments of the C-shaped circuits that each elementary module has.
Figure 19B:
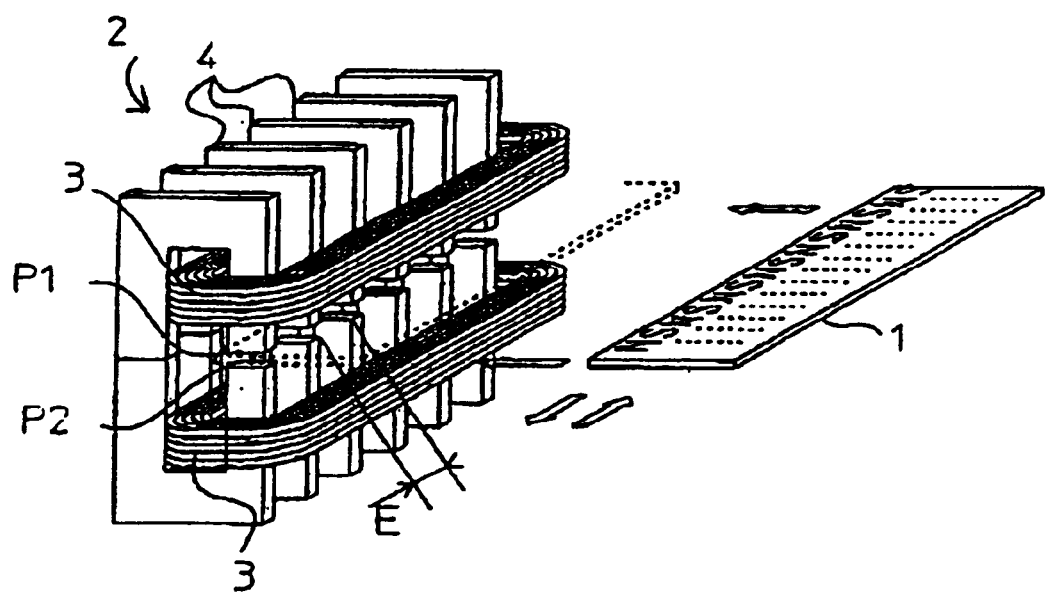
Figure 20:
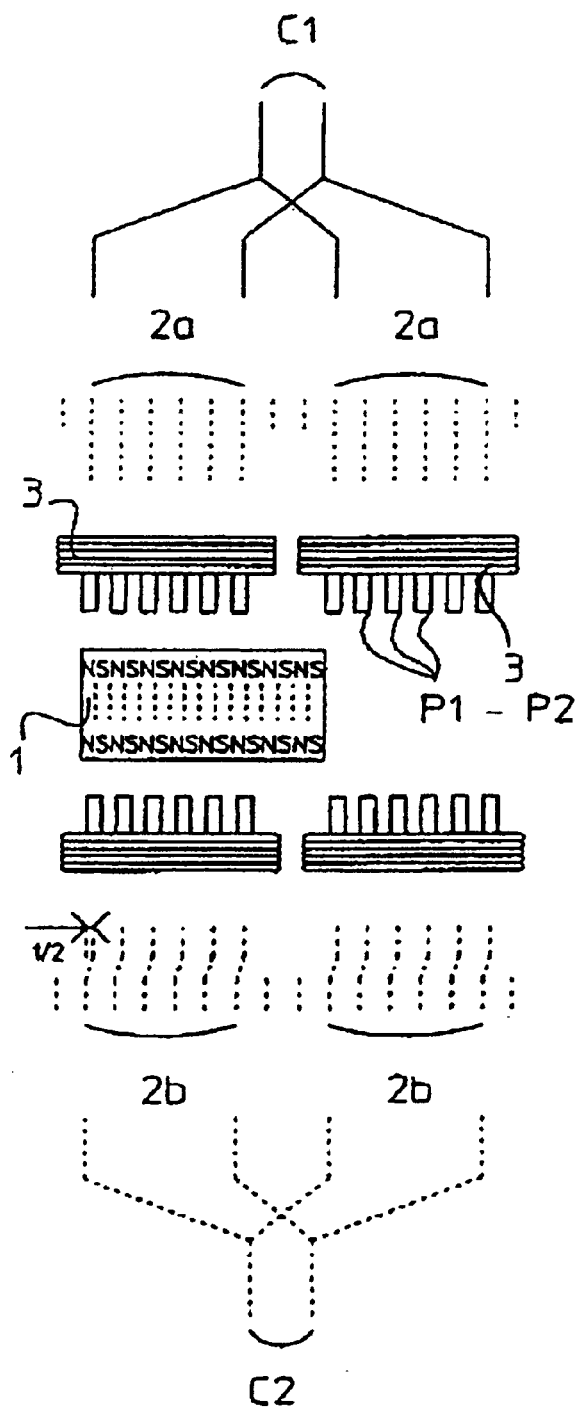
FIG. 20 illustrates the way in which the modules are supplied with two-phase current, FIG. 21a being a diagram showing the supply currents for the coils and FIG. 21b being a diagram showing the operating cycle of such an assembly.

FIG. 18 shows an example with six pairs of modules (2a, 2b) in which the modules (2a) and (2b) alternate in each of the two alignments on either side of the magnet. All the modules (2b) are offset in the same direction (in this case toward the top) of one half of the magnetic step.

Moreover, the magnetized plate, which displaces the cursor (5) supporting the yarn guide (6) that is associated with it, is guided by additional means, such as rollers (10) placed on the cursor (5), which is itself mounted on a central reinforcement (12) lying in the mid-plane of said magnetized plate between two series of magnetic poles. These rollers bear on stationary guides (11) extending over the entire width of the position of the textile machine to which the yarn has to be delivered.

In this embodiment, as indicated previously, the magnetized plate (1) therefore comprises, placed symmetrically with respect to its central part (12), two series of an alternation of North and South poles.

In this embodiment, the magnetic circuits (2a, 2b) therefore have the general shape of a C.

These circuits could be produced either as a single piece, but it will be preferable to produce them as two elementary parts, as illustrated in FIGS. 1a, 1b, 1c and 3, so as to make it easier to place the coils (3).

Each circuit must therefore have deep notches E so that the magnetic flux is concentrated in line with the posts (P1, P2) thus formed.

Two possibilities may be envisioned for producing such notches (E).

Figure 1A:
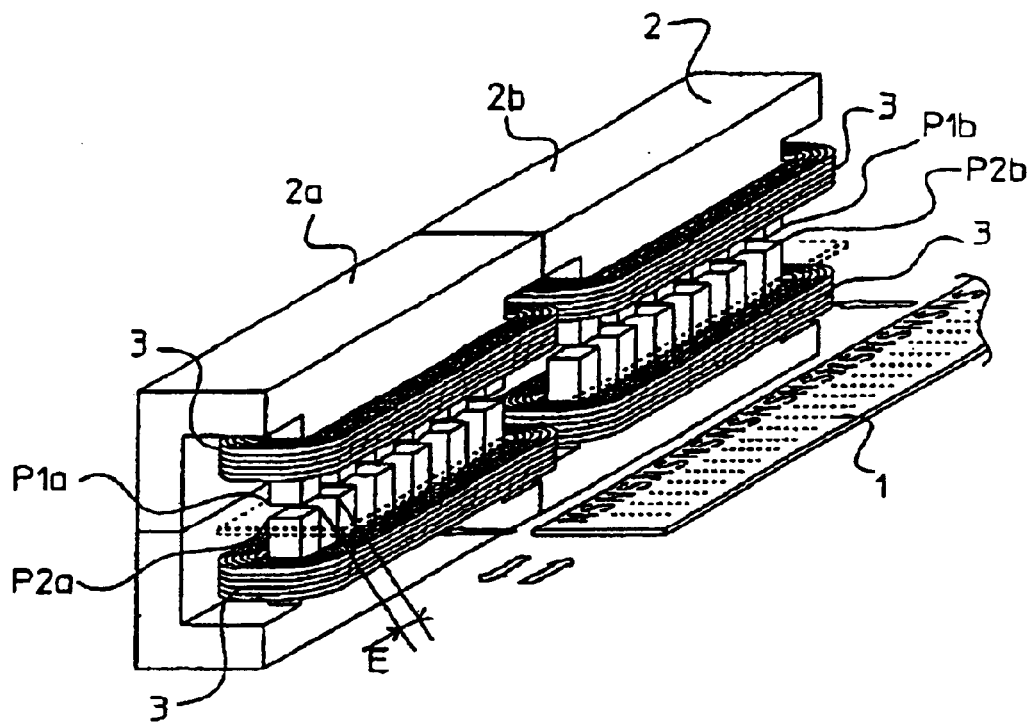
FIG. 1a is a perspective view illustrating the principle of the basic structure of a linear stepper motor used to produce a device according to the invention in one embodiment.

In the embodiment illustrated in FIG. 1a, the notches E defining the posts (P1) or (P2) are produced by machining or molding.

Figure 1B:
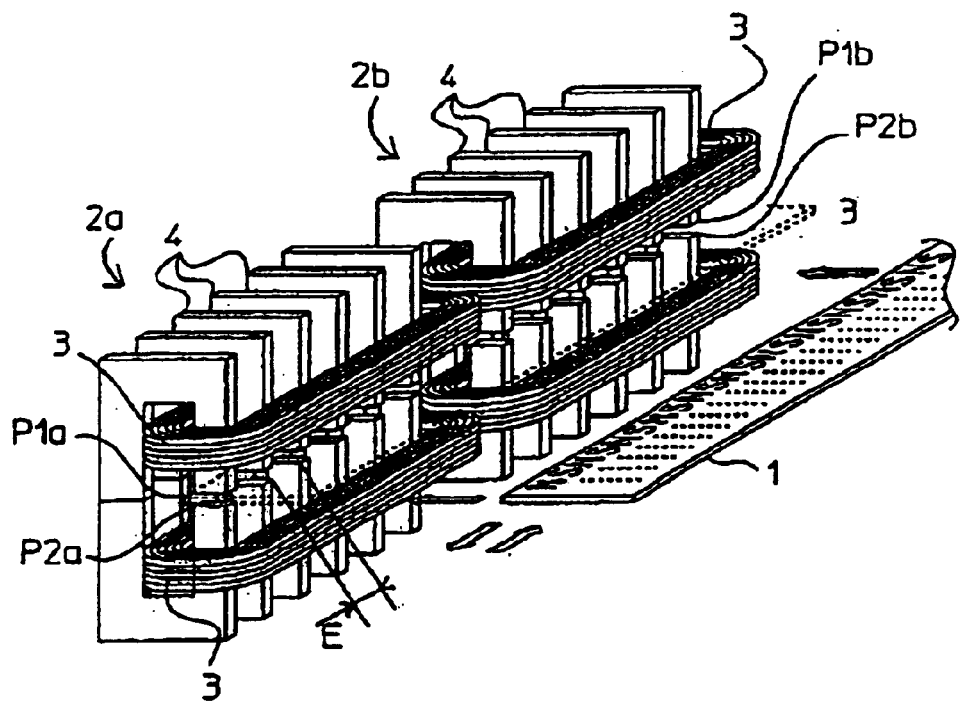
FIG. 1b illustrates a variant of such a basic structure.
Figure 1C:
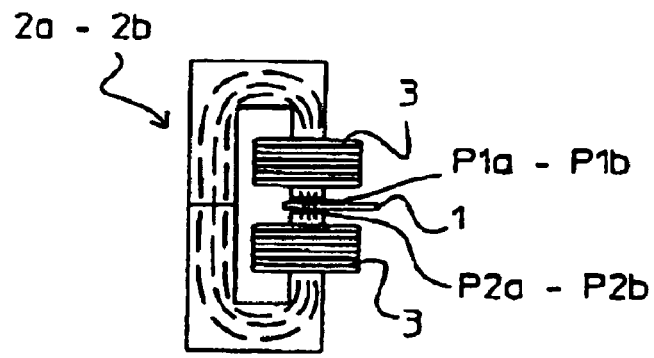
FIG. 1c shows, seen on end, the elementary magnetic circuit in such a motor.

In the alternative embodiment illustrated in FIGS. 1b and 3, each module consists of individual C-shaped metal plates (half-C or independent plates) kept spaced apart. Such an embodiment is more advantageous as regards iron losses and is easier to implement.

In order for the plate (1) and consequently the yarn guide (5, 6) carried by this plate, to undergo the to-and-fro displacement, the posts of each elementary circuit (2a, 2b) must therefore be alternately offset by one half of the magnetic step from one circuit (2a) to the next circuit (2b), this offset being obtained by the separation of the elementary modules, which in practice are identical.

To ensure correct operation, it is necessary that the moving magnetized plate (1) has a length such that it covers two stator elements (2a, 2b), thus making it possible to operate the motor in the same manner as a two-phase stepper motor.

In another embodiment, another operating method consists in placing the modules so as to face one another without an offset and in having a magnetized plate whose North/South alternation on one of its sides is offset by one half of the magnetic step relative to that of the other side.

To ensure correct operation, it is necessary for the moving magnetized plate (1) to have a length such that it covers two stator elements (2a, 2b) thus making it possible to operate the motor in the same way as a two-phase stepper motor. To receive a constant couple, the magnet plate will have a length at least equal to that of one module, and preferably a multiple length of that of a module.

Each two-phase supply combination creates a stable position of the moving magnet (1) corresponding to the best possible coincidence of the poles of said magnet with those of the stator. The concatenation by switching of these combinations causes the moving magnet (1) to be displaced toward successive stable positions, thereby making it possible to cause these movements by sending the appropriate sequences into the motor.

It is thus possible to carry out the operation in the conventional mode of stepper motors in whole steps, half-steps or micro-steps.

The number of posts and the length of the elements of the stator are defined according to the desired traction force.

Figure 7A:
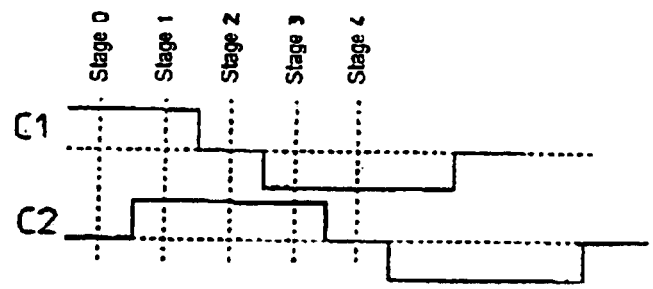
FIGS. 7a and 7b illustrate the operating cycle of an assembly produced according to one embodiment of the invention, and therefore comprising a succession of four aligned elementary modules constituting the stepper motor for displacing the yarn guide.
Figure 7B:
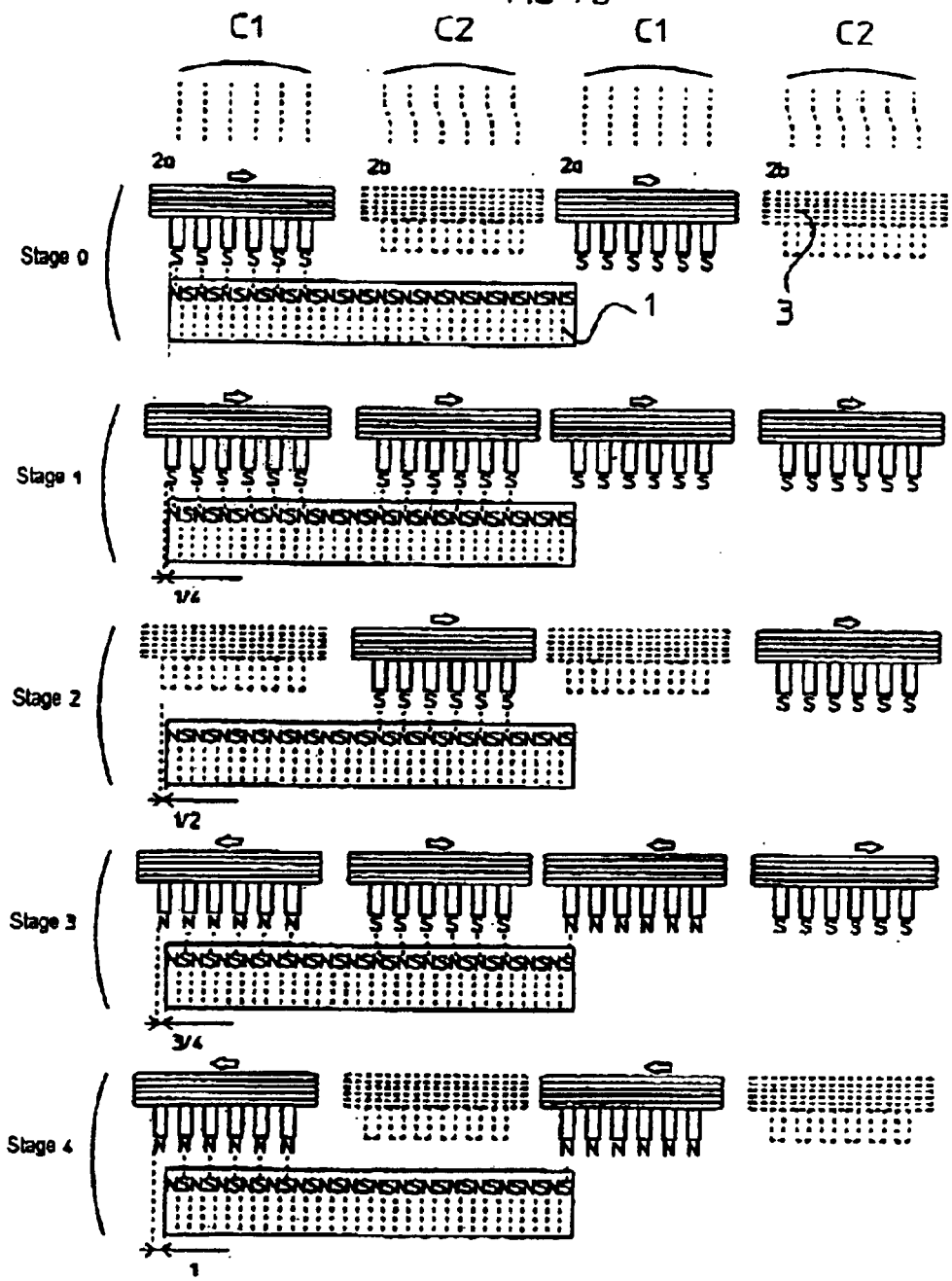
Figure 8:
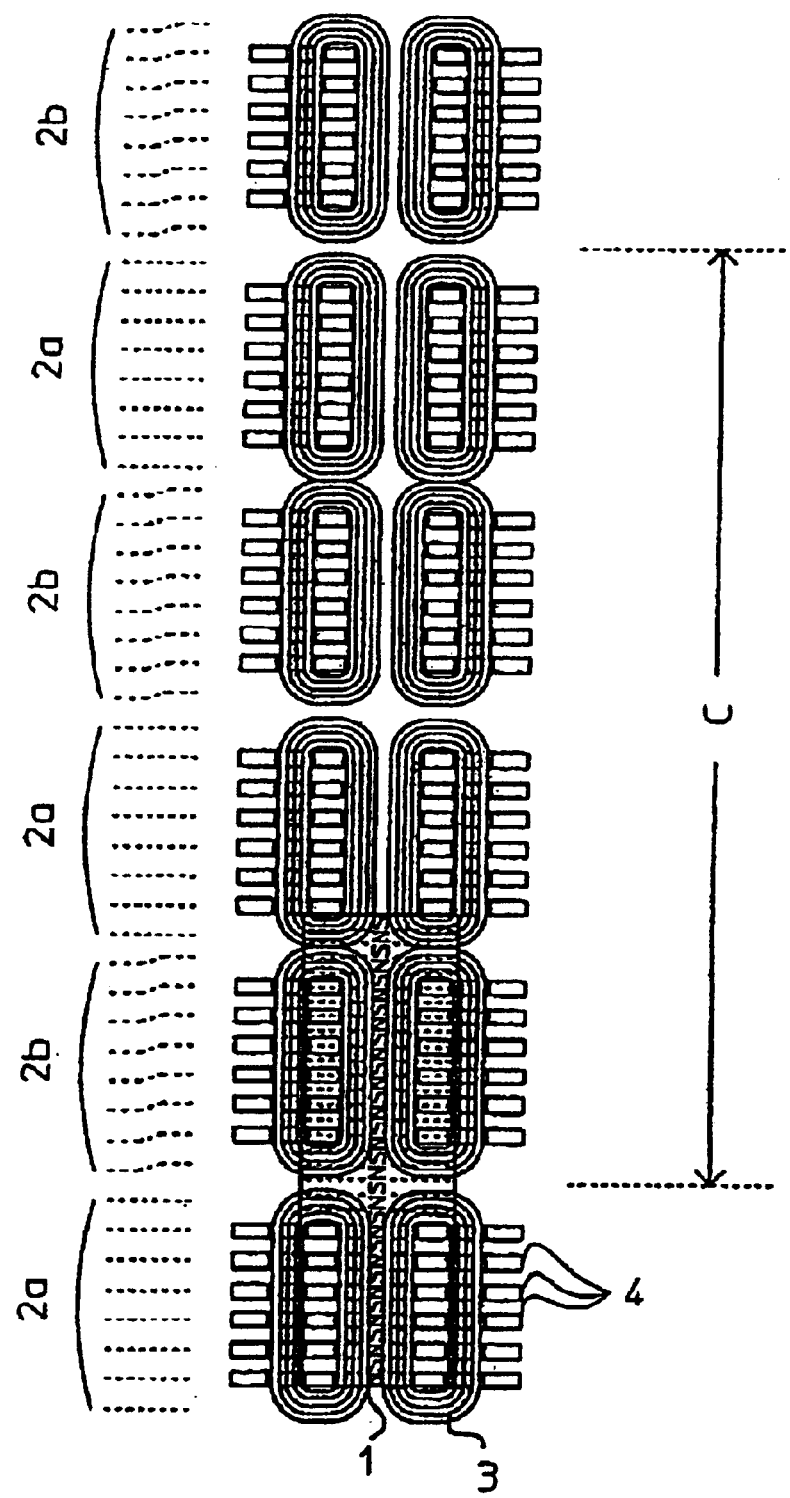
FIG. 8 is a schematic top view of a stepper motor produced according to the invention, comprising six elementary modules for displacing a magnetized plate, the length of which corresponds to two modules, with a displacement equivalent to the sum of the lengths of four modules.
Figure 9:
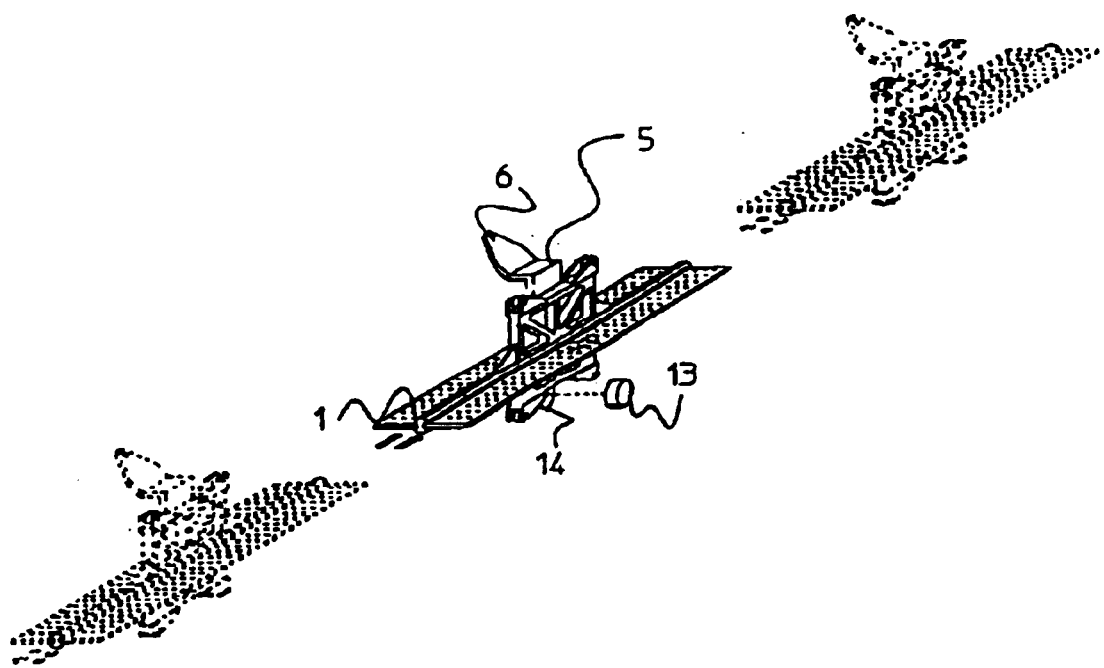
FIGS. 9, 10 and 11 illustrate, seen in perspective, three embodiments for precise detection of the position of the yarn-delivering cursor during the winding cycle so as to control the delivery sequences, and especially the sequences for reversal of the direction of displacement of the yarn-delivering guide at the end of travel.
Figure 10:
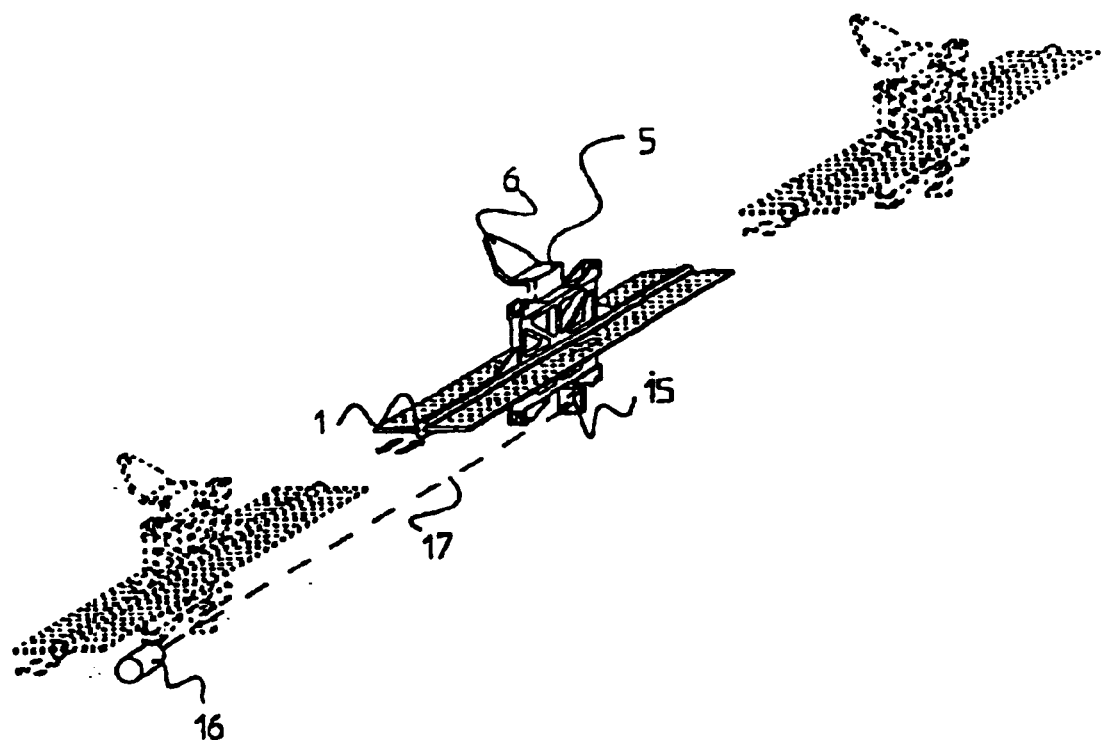

The operation of such a linear stepper motor as illustrated by FIGS. 7*a* and 7*b*, which show a motor designed on the basis of four elementary modules, this number not being limiting, and possibly being six as shown in FIG. 8.

Figure 5A:
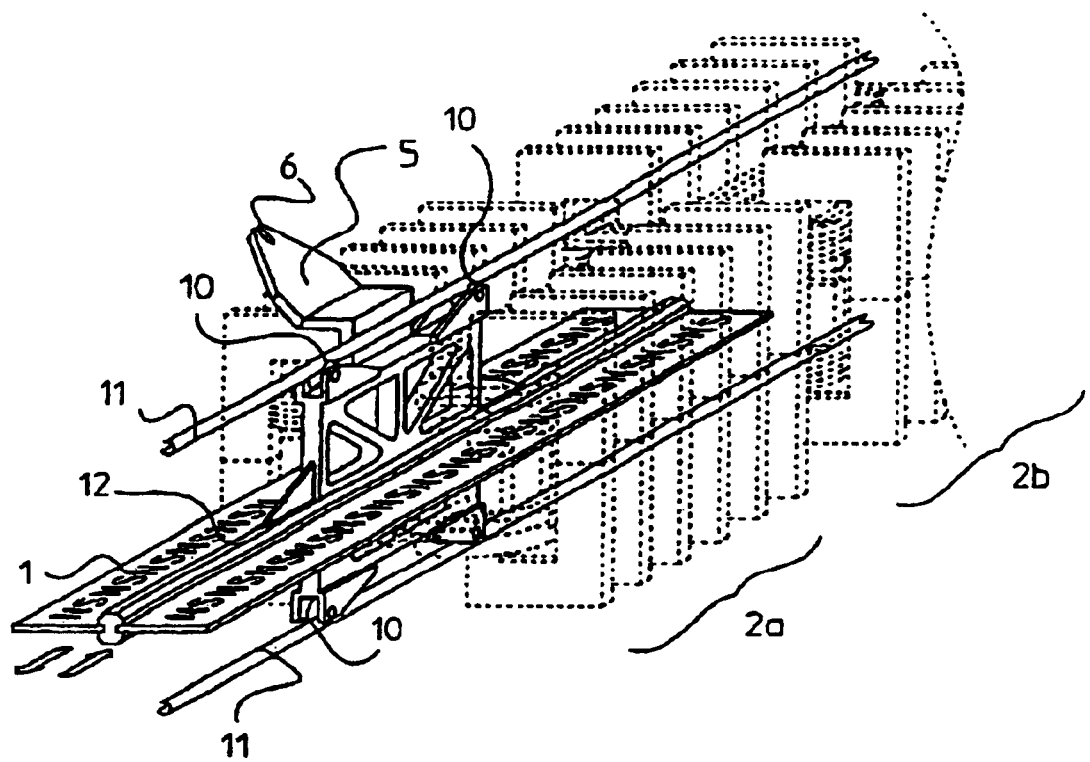
FIGS. 5a and 5b are detail views of an embodiment of guiding means for the depositing yarn guide driven by a stepper motor according to the invention.
Figure 5B:
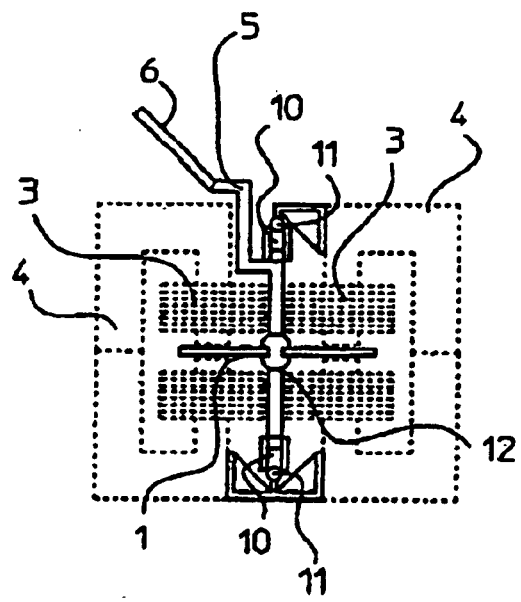

In the example as illustrated by FIGS. 17 and 18, the motor is designed on the basis of six elementary modules, forming two pairs of opposed elements (2*a*, 2*b*), this number not being limiting. Thus, FIG. 5 illustrates the case of an embodiment comprising four modules.

Each elementary module (2*a*, 2*b*) therefore comprises a C-shaped stator having a total width of 48 mm, the posts (P) produced in this stator numbering six, having a width of 2 mm and a length of 6 mm, and being separated from one another by a 4 mm space or notch (E).

The airgap between two posts (P1, P2) placed opposite each other is 1 mm.

As regards the magnetized plate (1), this has a thickness of between 0.6 and 0.8 mm and a length of 96 mm. Its width is around 20 mm.

Moreover, in the preferred embodiment according to the invention, it has, on its two lateral surfaces, an alternation of North and South poles (N/S) spaced apart by 3 mm, allowing implementation on an installation of the type illustrated by FIG. 3.

In FIGS. 7*a* and 7*b*, only one side is shown, but preferably there is a symmetrical arrangement as reillustrated in FIG. 8, by placing identical elements facing one another strictly symmetrically in relation to the axis of the flat magnet (1).

Each element (2*a*, 2*b*) is therefore formed from a magnetic circuit that has notches (E) and posts (P1, P2).

Figure 2:
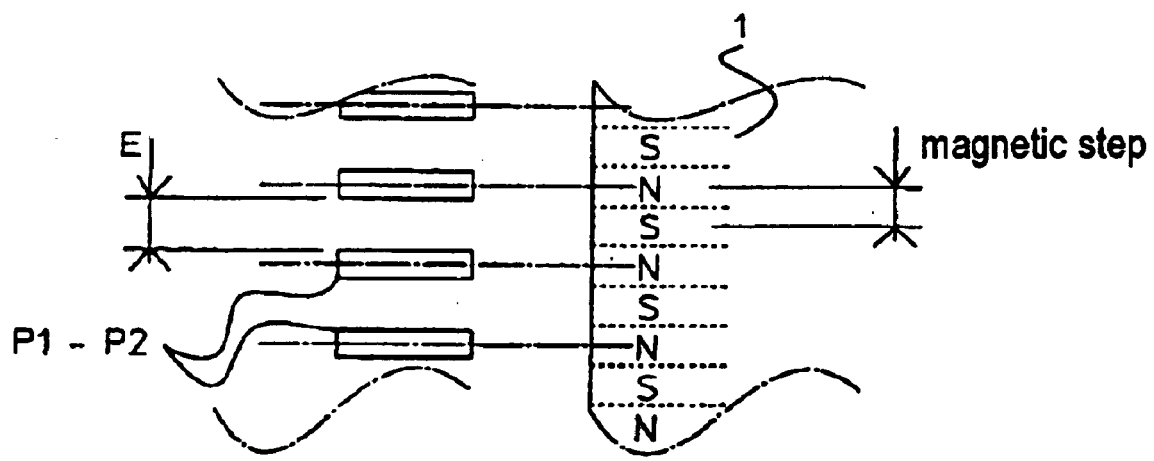
FIG. 2 is a schematic view showing the positioning of the posts of the magnetic circuits and the spacing that they have between them relative to the North and South poles of the moving magnet that can be displaced in the airgap of the stator produced according to the invention.

The center-to-center distance between two consecutive posts is therefore equal to twice the distance between two consecutive North/South poles produced on the flat magnet (see FIG. 2).

Each element shown in the embodiment therefore has six posts. Such a number of posts is not limiting, and it is, of course, possible to produce modules having any number of posts chosen according to the desired force and the desired power.

Figure 6:
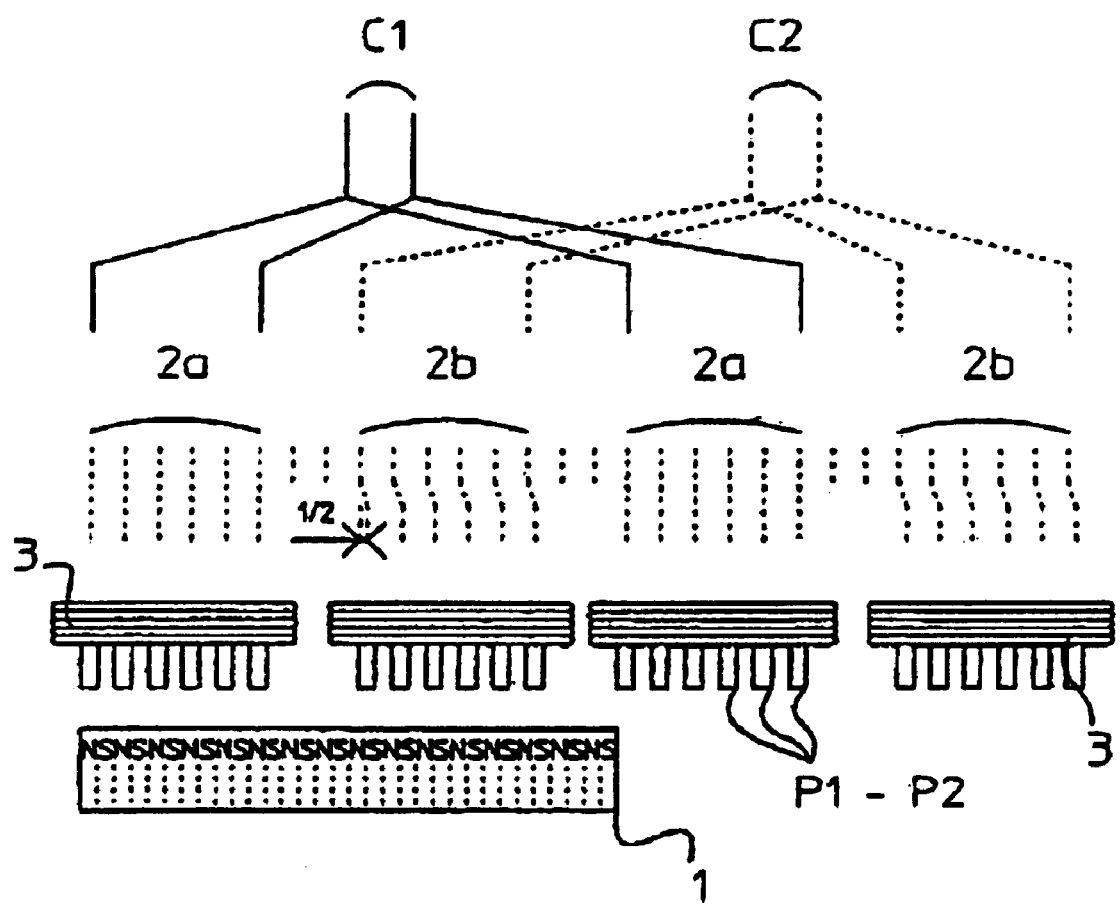
FIG. 6 is the schematic representation of the stators and of the moving element of an assembly for operating the yarn guide produced according to FIG. 1 and comprising four aligned elementary modules, and the way in which they are operated.

The arrangement of the modules therefore constituting the module is shown diagrammatically, for example, in FIGS. 4*a* to 4*c* and in FIG. 6. The elements of two consecutive modules (2*a*) are spaced apart by an integral number of pairs of North/South poles (N/S) of the magnet and in such a way that, irrespective of the position of the magnet (1), the posts all lie opposite a pole of the same sign. It should be noted that, in the motor according to the invention, the motor consists of an alternation of modules (2*a*) and (2*b*) such that the elements (2*b*) have posts that are all offset by half a step on the same side—in the example to the right—relative to the elements (2*a*).

In this way, when the magnet (1) is positioned in such a way that its poles of the same sign are aligned with the notches (E) and posts of the elements (2*a*), these same poles fall between two posts of even elements (2*b*). Conversely, when the magnet (1) is positioned in such a way that these poles of the same sign are aligned with the posts and notches of the elements (2*b*), these same poles fall between two posts of the elements (2*a*).

The electrical connection of such a motor, illustrated by FIG. 6, is as follows:

All the coils (3) of the elements (2*a*) are connected together at C1 on a supply system and all the coils (3) of the elements (2*b*) are connected to an assembly (C2) on another supply system. These supply systems send to the coils (3) voltages and currents that are controlled by microprocessors in an appropriate sequence.

The connection provided in the embodiment illustrated is a parallel connection, but it could also be a series connection.

The operating sequence of such a motor is as follows, and is apparent from FIGS. 7*a* and 7*b* or 20, 21*a*, 21*b*.

Figure 21A:
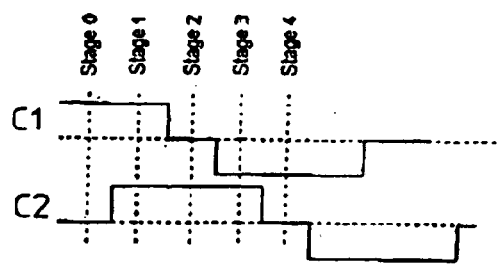

In a conventional "stepping" method of operation, the electronic control circuit injects the currents shown in the diagram illustrated in FIG. 7*a* or 21*a* into the coils (2*a*, 2*b*).

Figure 21B:
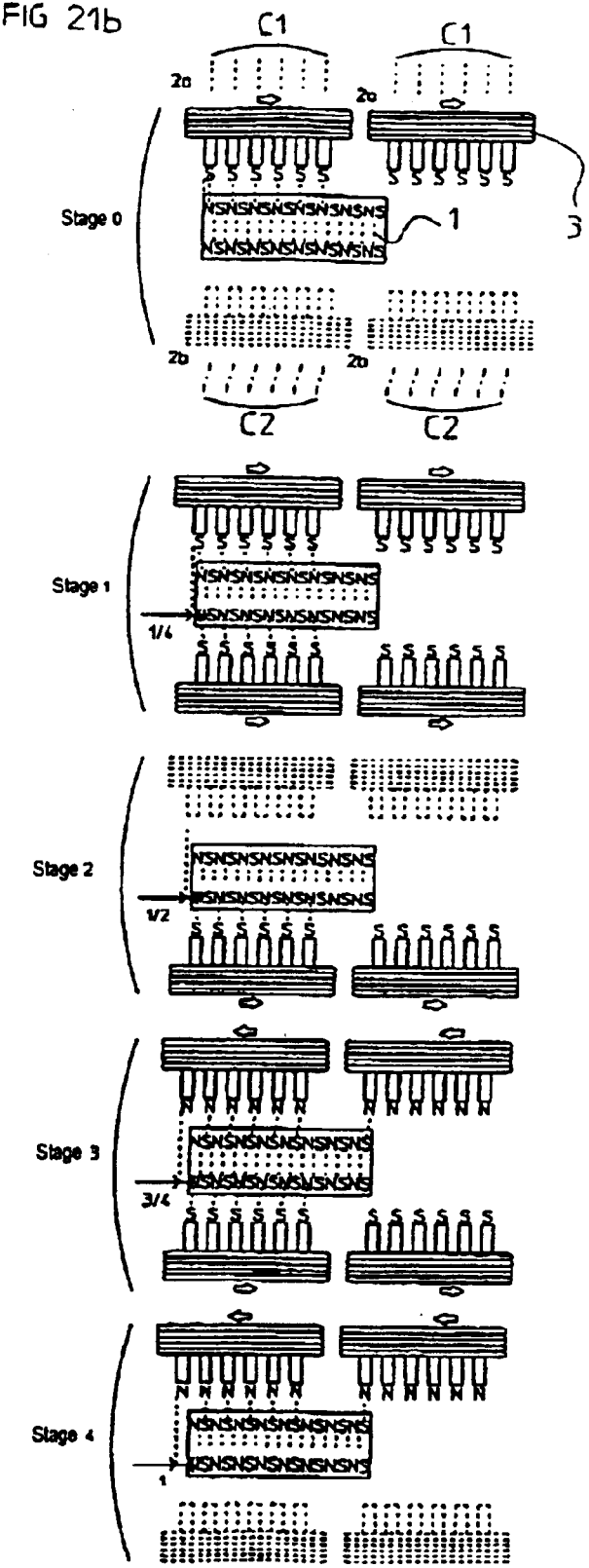
Figure 22A:
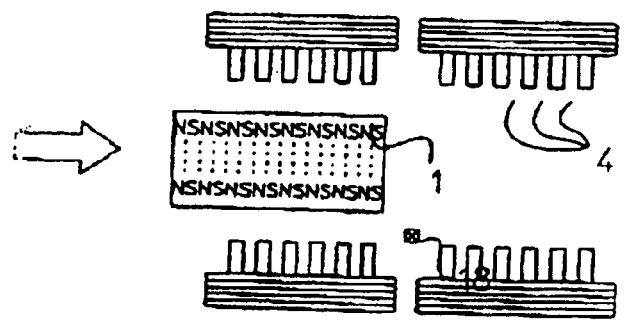
FIGS. 22a, 22b and 22c illustrate various types of detection means for commanding and controlling the reversal of the direction of to-and-fro movement.
Figure 22B:
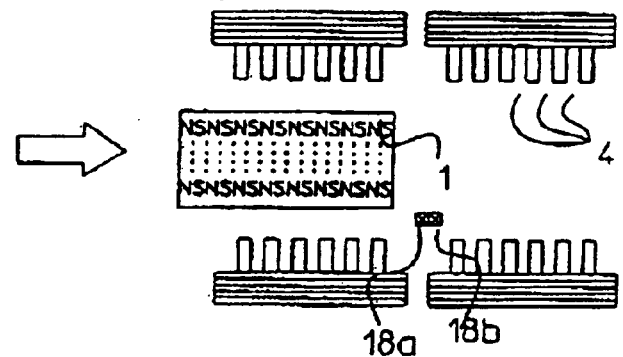
Figure 22C:
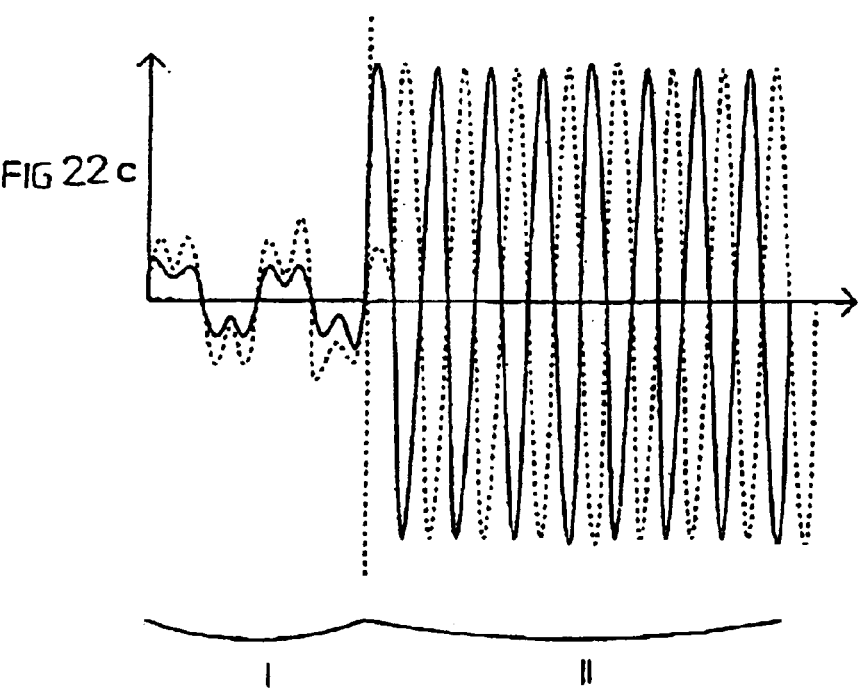

Such a stepping operation is shown clearly in FIG. 7*b* or 21*b*, and therefore comprises the following stages.

Stage 0:

The coils of the elements (2*a*) are supplied so as to make one pole (for example South in the diagram) appear on their posts. The elements (2*b*) are not supplied. The magnet (1) will therefore position itself in order to align its North poles with the South poles of the posts (P1) of the elements (2*a*).

Stage 1:

The coils of the elements (C2) are supplied so as to make a pole (for example South in the diagram) appear and the flat magnet will position itself in such a way that the attractive forces on the two series of posts are in equilibrium. In the example of the diagram, the magnet (1) will therefore move by one quarter of the magnetic step to the right. It will be seen that if a North pole had been made to appear, the magnet would be moved by one quarter of the step to the left.

Stage 2:

The supply to the coils (2*a*) is cut off. The magnet will align its North poles facing the posts (P2) of the elements (2*b*). Consequently, it again advances by one quarter of the step to the right.

Stage 3:

The elements (2*a*) are supplied so as to make a pole of the opposite sign to that of the previous stage but one (North in the example of the diagram) appear. As in Stage 1, the magnet will position itself in such a way that the traction forces are in equilibrium between all the elements. In the example of the diagram, the magnet again advances by one quarter of the step to the right.

Stage 4:

The supply to the elements (2*b*) is cut off and the magnet will now align its South poles so as to face the posts of the elements (2*a*).

After this sequence of four stages, the magnet will have been displaced four times by one quarter of the step, i.e. one complete step, that is to say the distance between two successive N-S poles. The situation is therefore one similar to Stage 0, but with polarities of the opposite sign).

By Continuing the Sequence:

Stage 5: 2*b* is supplied (North pole);

Stage 6: 2*a* is cut off;

Stage 7: 2*a* is supplied (South pole);

Stage 8: 2*b* is cut off.

After this new sequence, the magnet again has progressed by one magnetic step.

The procedure is repeated again and again. The order of the sequence determines the direction of displacement and the switching frequency determines the speed of displacement.

This "single step" method of operation is similar to that of the operation of conventional stepper motors. This same type of motor can therefore be operated by the conventional electronic circuits intended for operating linear or rotary stepper motors. As in the case of the other stepper motors, these electronic circuits may allow "half-step" or "micro-step" operation in order to improve the precision or the performance of the motor by optimizing the voltage and the current in the coils according to the required speeds and accelerations.

To command and control the reversal of the direction of the to-and-fro movement, means for detecting the position of the yarn guide are associated with the assembly according to the invention. Such detection means may be formed by a photoelectric cell (13–14), or a mirror (15) associated with a laser sensor (16), and are advantageously formed, as shown in FIG. 11, by one or more sensors based on a Hall-effect probe.

Figure 11:
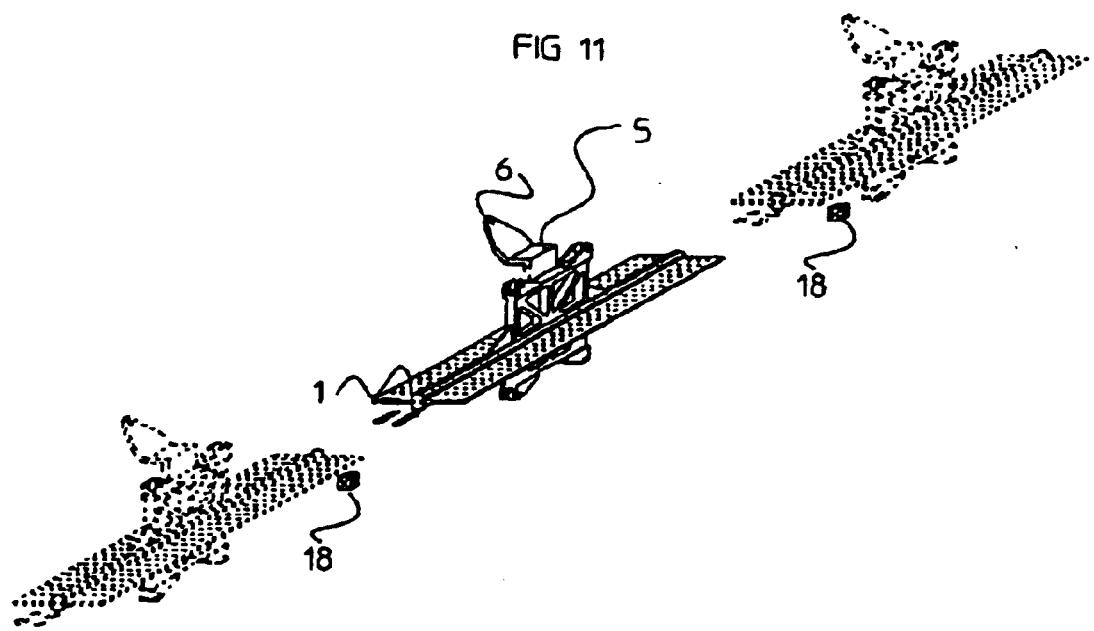

FIG. 11 shows how a fixed Hall-effect probe (18) is placed, near the passage for the flat magnet (1), in order to detect said passage and measure its displacement. This Hall-effect probe (18) delivers a signal proportional to the magnetic field.

Figure 11A:
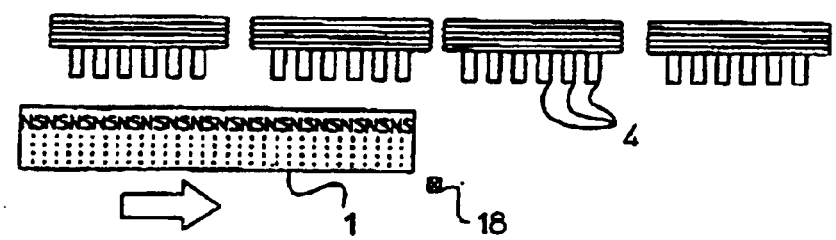
FIGS. 11a and 11b illustrate the manner in which a position detector based on a Hall-effect probe as illustrated in FIG. 11 operates.

As shown in FIG. 11a, the Hall-effect sensor (18) is preferably located in a region lying between two consecutive elements (2a, 2b) so that the flux from the coils do not disturb the measurement.

Figure 11B:
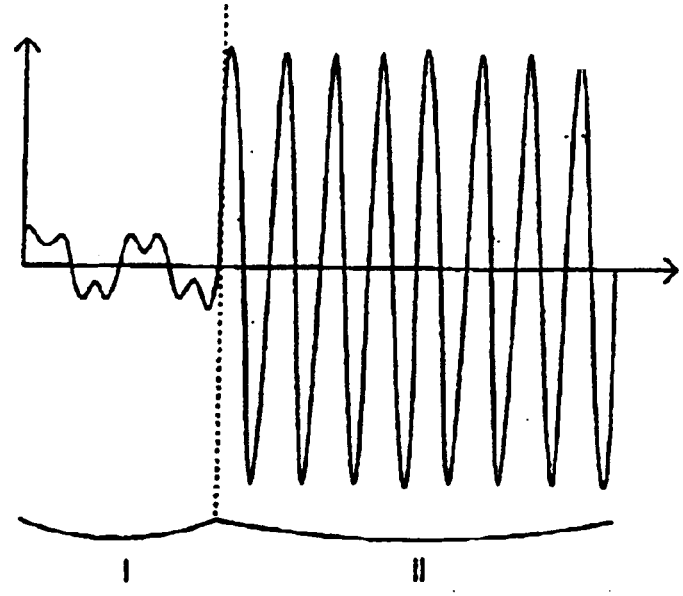

FIG. 11b shows the curve of the signal on arrival of the magnet (1). Before the arrival of the magnet, the Hall-effect probe (18) picks up the signals coming from the magnetic leakage fields emanating from the motor elements (2a, 2b). As soon as the magnet (1) passes in front of the probe (18), the signal exhibits an edge followed by half-cycles that correspond to the running of its North/South-North/South poles.

By detecting the first signal edge, the arrival of the magnet (1) in front of the probe (18) is sensed, thereby making it possible to initialize and reset the set of counters intended for measuring the position of the magnet (1).

The passage of the poles is measured by detecting the successive half-cycles, and thus it is possible to determine, by counting the steps, the position and the displacement of the magnet and to check that the movement of said magnet correctly conforms to the command sequence. This device constitutes a means of detecting any loss of step.

Figure 12A:
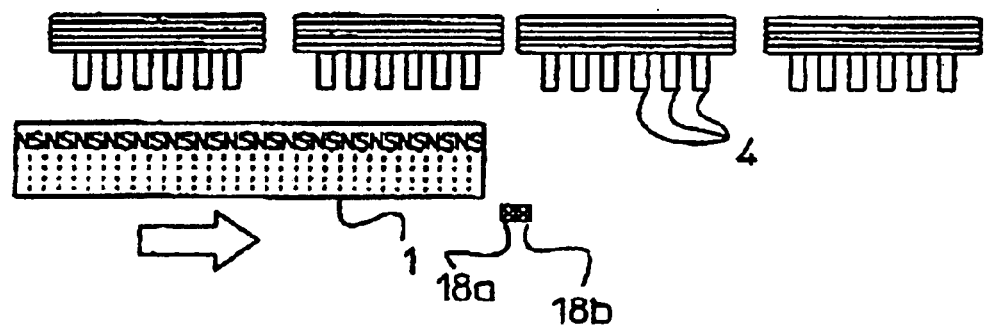
FIGS. 12a and 12b illustrate an alternative method of detection by several offset detectors.
Figure 12B:
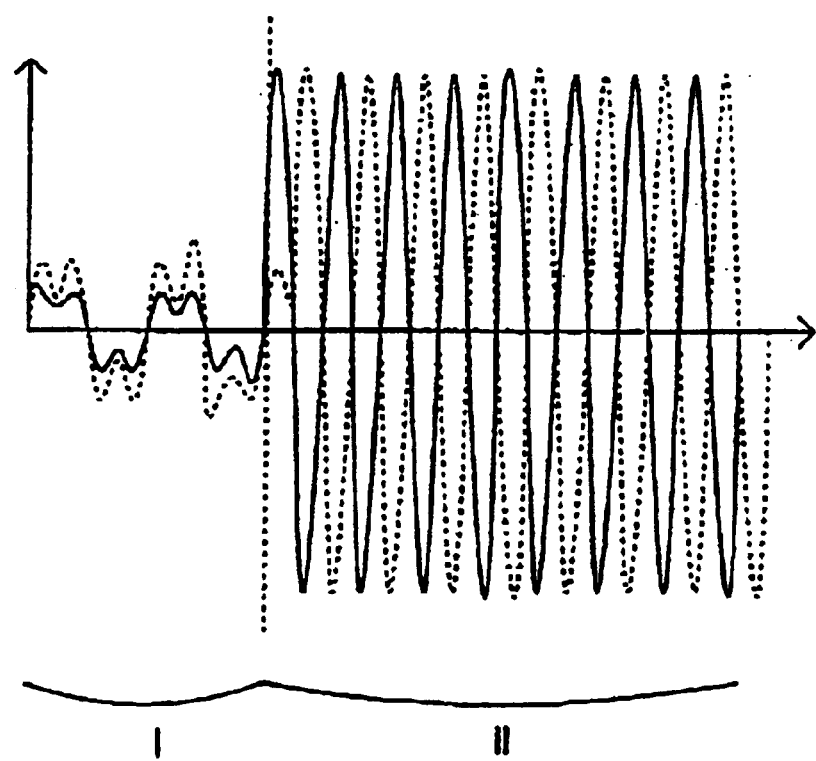

It is also possible for detection to be carried out by several offset sensors, as shown in FIGS. 12a, 12b.

FIG. 12a illustrates the arrangement of two sensors (18a, 18b) offset by one half of the magnetic step.

This second sensor (18b) makes it possible, by simple processing, to double (or triple, with three sensors, etc.) the accuracy in measuring the position of the magnet (1).

By more sophisticated processing, it is possible to interpolate between two (or more) signals in order to obtain an accurate determination of the position of the magnet. The accuracy is then of the order of a fraction of a step and allows the drive electronics to carry out very precise servo-control of the position of the magnet (1).

In the operating example describe above, the supply is therefore a two-phase supply.

Figure 13:
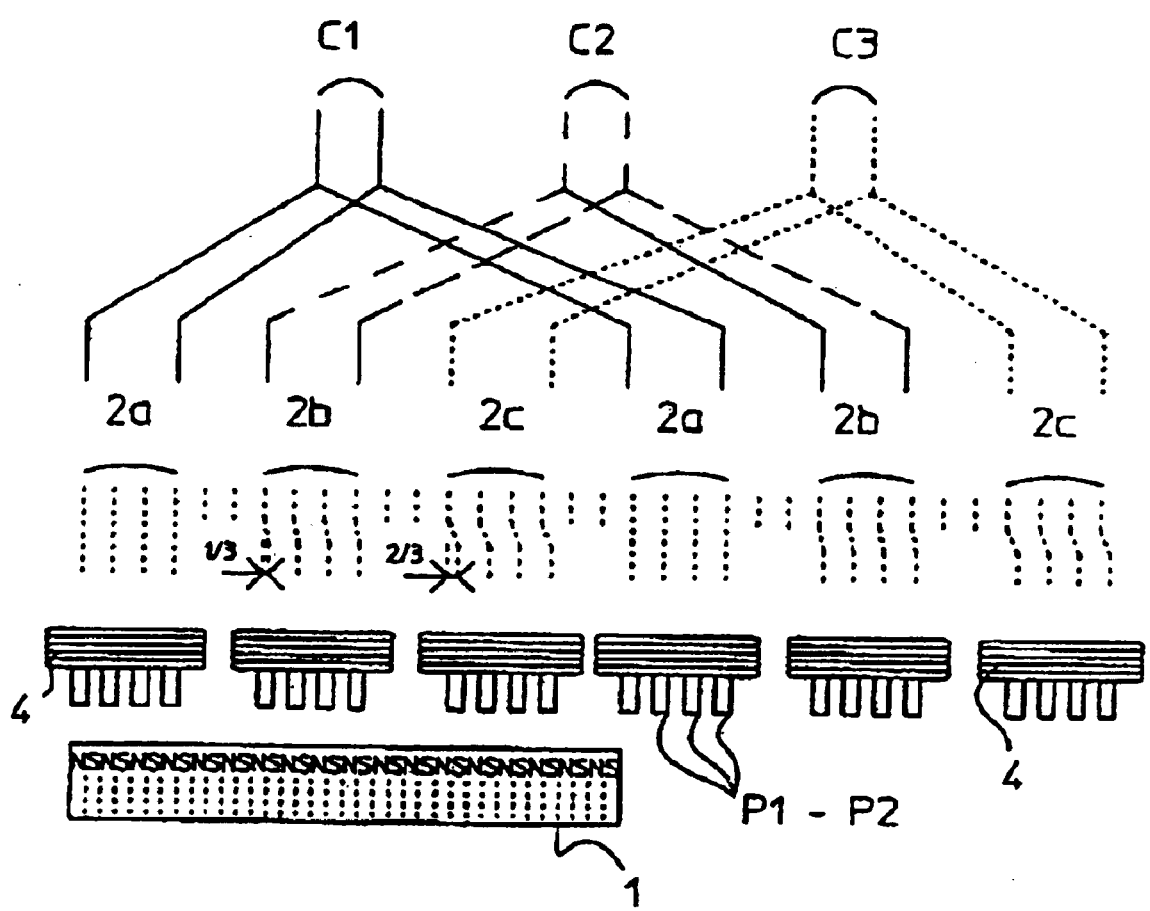
FIG. 13 illustrates an alternative form of a stepper motor according to the invention, the supply for which is a three-phase supply.

FIG. 13 illustrates an embodiment in which the supply is in a three-phase configuration. In this embodiment, for the sake of simplification, only one series of elementary modules has been shown, but an identical set may be mounted symmetrically with respect to the longitudinal axis of the flat magnet (1) as described above in the case of the device supplied by a two-phase supply.

As in the case of a two-phase supply, each module is formed from magnetic circuits that have posts and notches. The step of the notches is equal to twice the distance between two successive North/South poles on the flat magnet (1), this distance being denoted by the term "step". Each elementary module (2a, 2b, 2c, 2a, etc.) is, in this illustrative example, represented with four posts per module, but it would of course be conceivable to have a different number of posts depending on the desired force or power.

In this illustrative example with a three-phase supply, the device according to the invention therefore comprises at least four identical modules (2a, 2b, 2c, 2a, etc.).

The modules (2a, 2b, 2c) are placed so that the posts of a module (2a) are offset relative to a module (2b) and relative to a module (2c) by one third of the magnetic step. The length of the magnetized plate is, in this embodiment, equivalent to the length of a set of three modules (2a, 2b, 2c) for a travel corresponding therefore to at least the length of one module.

Thus, the modules (2a) which create the magnetic circuits (4a) are spaced apart by an integral number of pairs of North/South poles of the magnet in such a way that, irrespective of the position of the magnet (1), the notches all lie facing a pole of the same sign. The modules (2b) are themselves placed in such a way that the notches are all offset by one third of the step on the same side, that is to say to the right in the example. The modules (2c) themselves are positioned in such a way that the notches are all offset by two thirds of the step on the same side, namely on the right.

In such an assembly, when the magnet (1) is positioned in such a way that the poles of the same sign are aligned with the posts of a group of magnets, these poles are offset by one third of the step to the right in relation to a second group and by one third of the step to the left in relation to the third group.

The electrical connection of a motor produced in accordance with the invention is as follows.

All the coils (3) of the modules (2a) are connected together at C1, all the coils (3) of the modules (2b) are connected at C2 and all the coils of the modules (2c) are connected at C3.

Figure 14A:
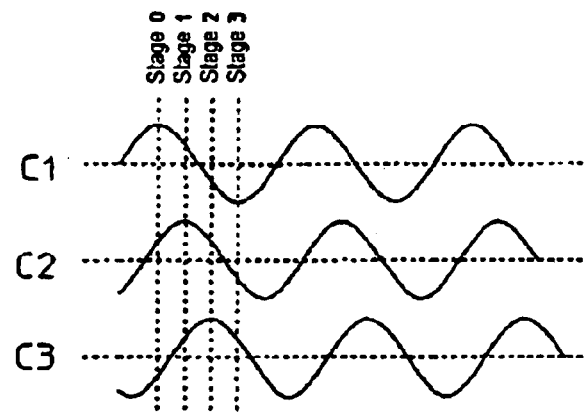
FIGS. 14a and 14b illustrate the command system and the operation, respectively, of an assembly produced according to the invention, the power supply for which is a three-phase supply.
Figure 14B:
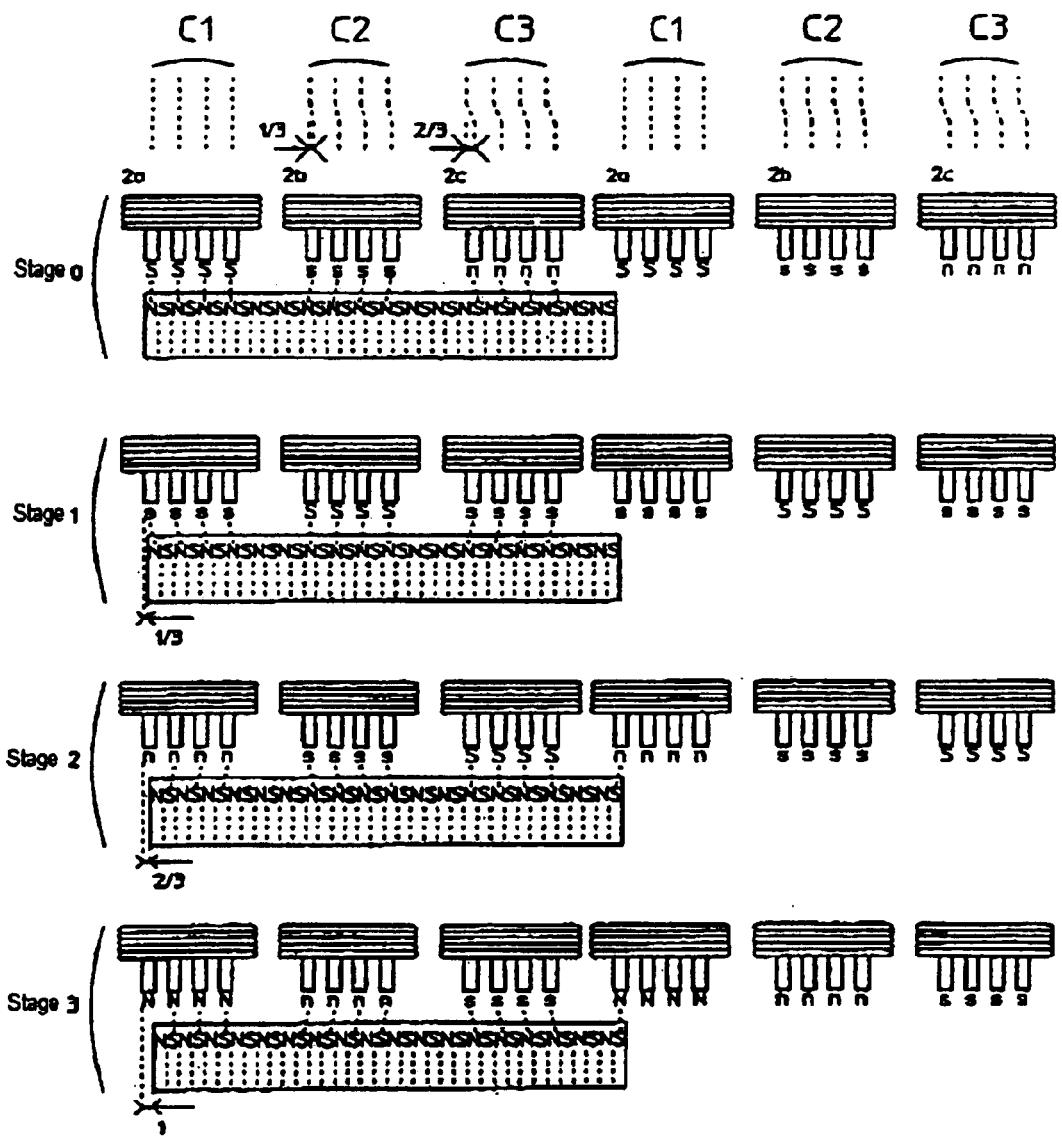
Figure 15A:
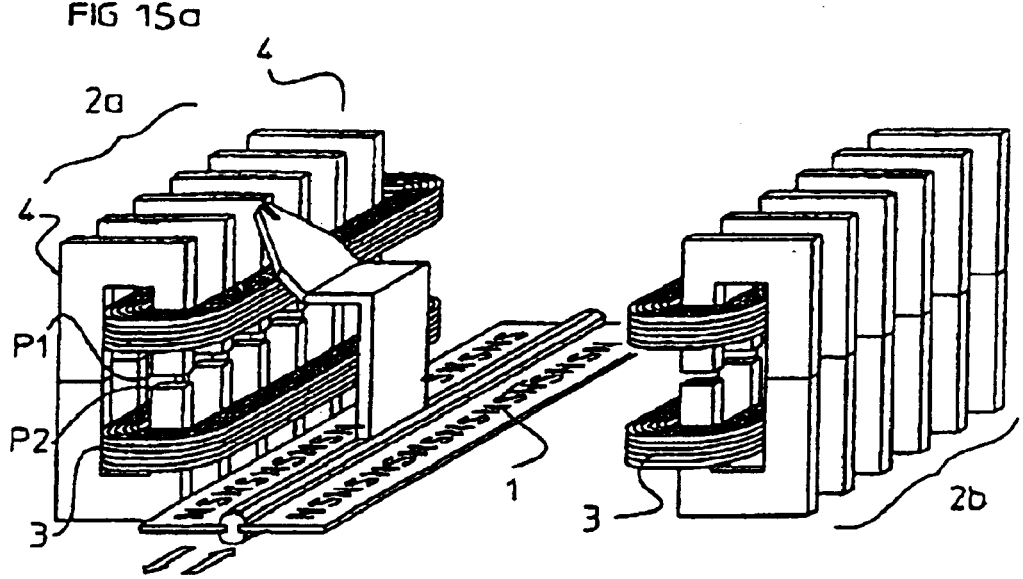
FIGS. 15a, 15b, 15c and 16 illustrate, in perspective (FIGS. 15a and 15b), in end view (FIG. 15c) and in top view (FIG. 16), the general design of a pair of modules placed facing each other, constituting the basic element of a linear stepper motor capable of being operated in order to make a guide undergo the to-and-fro displacement necessary for depositing a yarn on a support (package)
Figure 15B:
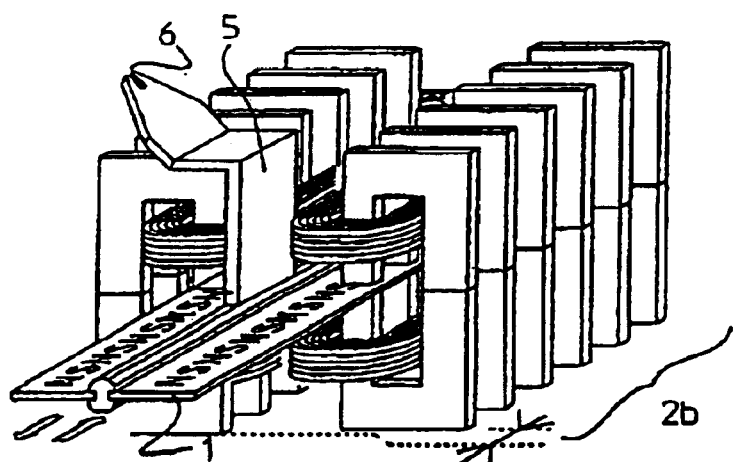
Figure 15C:
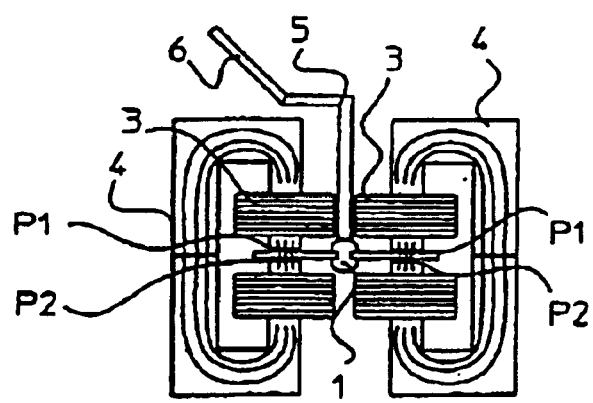
Figure 16:
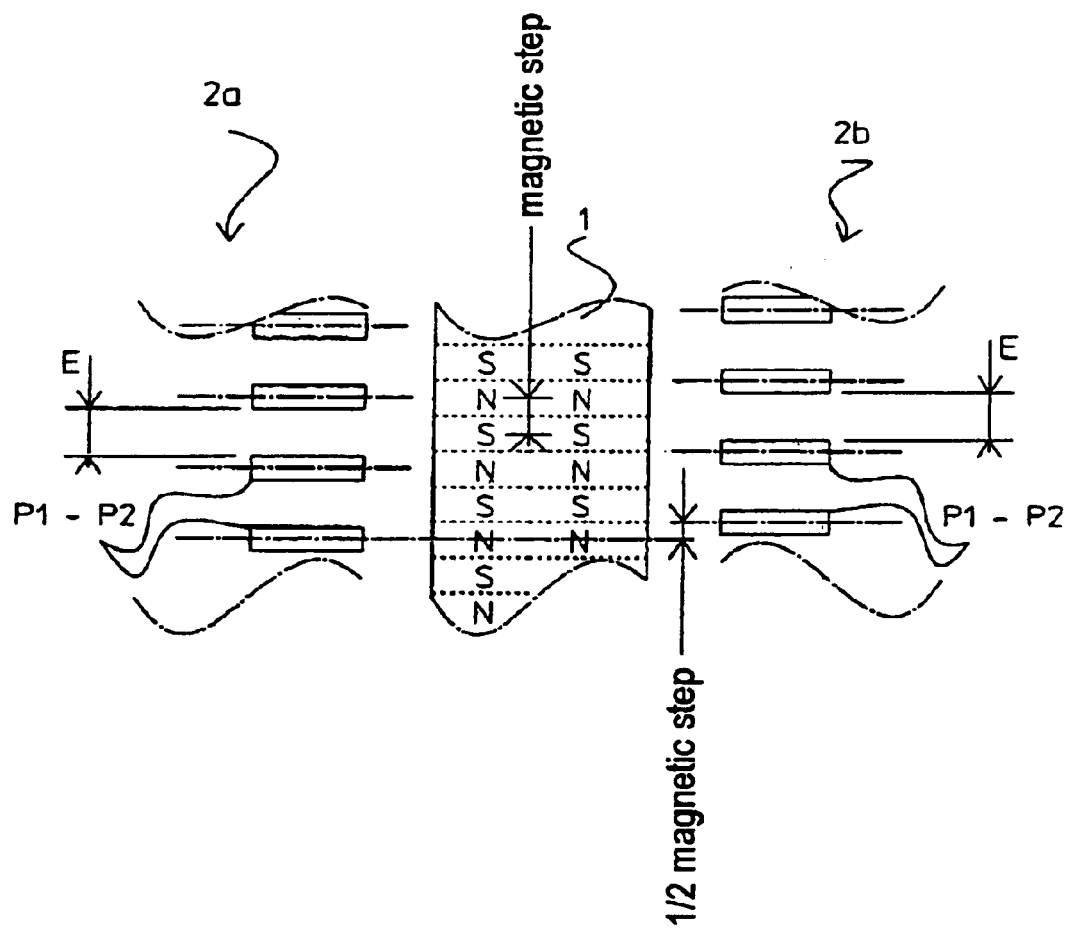

The connection may be carried out in series or in parallel, which connection is shown in FIG. 14b.

The operation of such an assembly is as follows.

In a conventional method of operation, similar to that of three-phase (or brushless) synchronous motors, the electronic drive circuit injects the currents shown in the diagram (14a) into the coils (C1, C2 and C3).

By way of indication, this operation is explained in FIG. 14b.

Stage 0:

The coils (24a) are supplied so as to make a pole of maximum intensity (for example SOUTH in the diagram) appear on their posts. The magnet will be positioned so as to align its NORTH poles on the SOUTH poles of the posts presenting the maximum magnetic flux, thereby corresponding to a position in which the attractive forces on the other elements are balanced.

Stage 1:

The three currents have changed in such a way that the coils of the elements (2b) are supplied so as to make a pole of maximum intensity (for example SOUTH in the diagram) appear. The magnet will be positioned so as to align its NORTH poles on the SOUTH poles of the posts presenting the maximum magnetic flux, thereby corresponding to a position in which the attractive forces on the other elements are balanced. The magnet is displaced to the right by a second third of the step.

Stage 2:

The three currents have changed in such a way that the coils of the elements (2c) are supplied so as to make a pole of maximum intensity (for example SOUTH in the diagram) appear. The other elements are supplied by equal (in absolute value) and lower currents. The magnet will be positioned so as to align its NORTH poles on the SOUTH poles of the posts presenting the maximum magnetic flux, thereby corresponding to a position in which the attractive forces on the other elements are balanced. The magnet is shifted to the right by a second third of the step.

Stage 3:

The three currents have changed in such a way that the coils of the elements (2a) are supplied so as to make a pole of maximum intensity opposite that of Stage 0 (now NORTH in the diagram) appear. The other elements are supplied by equal (in absolute value) and lower currents. The magnet will be positioned so as to align its SOUTH poles on the NORTH poles of the posts presenting the maximum magnetic flux, thereby corresponding to a position in which the attractive forces on the other elements are balanced. The magnet is displaced to the right by a third third of the step.

After this sequence of three stages, the magnet will be displaced three times by one third of the step, i.e. one complete step (distance between two successive N-S poles). The situation is therefore again similar to that of Stage 0, but with the polarities of opposite sign.

The procedure is then repeated again and again. The order of the phases determines the direction of displacement and the switching frequency determines the speed of displacement.

This drive method is similar to that used for driving conventional three-phase synchronous motors or brushless motors. This type of motor can therefore be driven by the conventional electronic circuits intended, for example, for driving brushless motors, especially those used as servomotors. As in the case of other synchronous or brushless motors, these electronic circuits may make it possible to carry out closed-loop control thanks to position sensors, resolvers or encoders in order to improve the accuracy or the performance of the motor by optimizing the voltage and the current in the coils according to the required speeds and accelerations.

This is therefore the very benefit of the abovementioned use of Hall-effect probes.

The device according to the invention has major advantages over the prior solutions.

This is because the key feature of the type of linear motor used to displace the yarn guide lies in the fact that only the modules that are placed facing the magnet are active. Consequently, the other elements or modules may be disconnected during the entire time when the magnet is beyond their range.

This feature is particularly beneficial in the case of to-and-fro movements. This is because, to obtain a rapid return, it is necessary for the motor to provide large electromagnetic forces, which means that large currents must be applied to the coils (the force depends on the magnetic flux and therefore on the current in the coils).

The very large currents applied to the windings cause overheating, such that it may rapidly lead to destruction of the motor. To avoid this problem, it is known to use the method consisting in maintaining these high currents only during the transient start and stop phases.

In the case of the modular linear motor proposed, it is possible for the elements to be completely cut off from the supply as soon as the magnet has left them, thereby allowing the coils time to cool down. Thanks to this modular configuration, the windings work only a fraction of the time and can therefore be subjected, during this fraction of time, to higher currents and therefore offer superior performance, than motors in which the windings are always active.

Such a device can also be used for any type of system for winding onto a support package in which the delivery of the yarn has to be carried out by means of a reciprocating system.

I claim:

1. A device for winding, at high speed, a yarn onto a rotating support and comprising a yarn delivery system including a depositing yarn guide, displaced so as to undergo a to-and-fro movement parallel to a surface of said support with rapid deceleration and acceleration at a point of reversal of the to-and-fro movement, the depositing yarn guide being displaced by means of a moving element or cursor associated with a magnetized plate of a linear motor, supplied with two-phase or three-phase current, wherein a stator of the linear motor is formed by at least one assembly of elementary modules placed either face to face or placed so that each lies in an extension of another, each having a plurality of C-shaped magnetic circuits that define, between ends of their separated legs, an airgap inside which the magnetized plate is positioned, comprising an alternation of North and South poles (N and S), which constitutes the moving element that displaces the cursor carrying the yarn guide and in which:

the magnetic circuits of each elementary module are formed by a plurality of pairs of posts (P1, P2) placed opposite each other in each pair, each series of posts (P1 and P2) being associated with a coil in order to form a magnetic field in the airgap that they define, the spacing between two consecutive posts corresponding to twice the distance between two consecutive North/South poles (N/S) provided on the magnetized plate;

posts of a module that are connected to one and the same phase of the electrical supply are offset relative to posts that are connected to the other phase or other phases by a value corresponding to the magnetic step divided by the number of phases;

the magnetized plate has dimensions enabling it to be inserted into the airgap of at least one elementary module of each of the supply phases, especially a length in order to cover two aligned modules (with a two-phase supply) or three aligned modules (with a three-phase supply), or especially a width in order to cover two modules (with a two-phase supply) that are placed facing each other, said plate comprising, on these two phases, an alternation of North/South poles (N/S) spaced apart by a distance corresponding to at least the half-distance lying between two consecutive posts; and means are provided for keeping the magnetized plate strictly in a mid-plane of the airgap of the magnetic circuit.

2. The device as claimed in claim 1, in which the electrical supply is a two-phase current supply, and wherein the device comprises at least three aligned elementary modules, posts of a central module being offset by one half of the magnetic step, on the same side, relative to the posts of a preceding module and of a following module which is associated therewith.

3. The device as claimed in claim 1, in which the electrical supply is a three-phase current supply, and wherein the device comprises at least four aligned elementary modules, the posts of a second module being offset by one third of the magnetic step and on the same side relative to the posts of a preceding module, and the posts of a third module being offset by one third of the magnetic step relative to the posts of the second module.

4. The device as claimed in claim 1, comprising two stators comprising aligned elementary modules, said stators being mounted symmetrically on either side of a central plane of symmetry, the magnetized plate, which constitutes the moving element that displaces the yarn guide, having, placed symmetrically with respect to its longitudinal axis, on both its faces and in a region located in the airgap of the posts, an alternation of North and South poles that are placed in correspondence, the yarn guide being mounted on a cursor fixed to a central reinforcement lying in a mid-plane of said magnetized plate between two series of magnetic poles.

5. The device as claimed in claim 1, wherein the electrical supply is a two-phase current supply, and wherein the device comprises at least one pair of two modules facing each other, connected to each of the two phases respectively, the posts of one of the modules being offset by one half of the magnetic step relative to the posts of the module that faces it.

6. The device as claimed in claim 1, comprising a plurality of pairs of opposed modules making it possible to obtain any travel:
   modules connected to one phase being placed in such a way that their posts are spaced apart by an integral number of pairs of magnetic steps so that, whatever the position of the magnetized plate, their posts are facing a pole of the same sign; and
   modules connected to the other phase are placed in such a way that their posts are spaced apart by an integral number of pairs of magnetic steps, and therefore in such a way that, whatever the position of the magnetized plate, their posts are facing a pole of the same sign, and in such a way that they are all offset by one half of the magnetic step and in the same direction relative to the posts of the modules connected to the one phase.

7. The device as claimed in claim 5 wherein all the modules connected to any one phase are aligned on the same side of the magnetized plate.

8. The device as claimed in claim 5, comprising an alternation of modules in such a way that, on each side of the magnetized plate, the aligned modules are connected to the two phases alternately, each having, facing it, a module connected to the opposite phase.

9. The device as claimed in claim 1, wherein all the modules may be placed so as to face one another and in alignment without any offset, the magnetized plate then having, on either side of its axis of symmetry, an alternation of North/South poles offset by one half of the magnetic step, and in this case all the modules located on one and the same side of the magnet are connected to the same phase.

10. The device as claimed in 1, wherein the C-shaped magnetic circuits of each module are produced in a one-piece assembly by machining or molding hollowed-out notches in order to define consecutive posts placed in pairs opposite each other and defining an airgap between them.

11. The device as claimed in claim 1, wherein the C-shaped magnetic circuits of each elementary module are formed by a succession of C-shaped plates separated from one another.

12. The device as claimed in claim 1, wherein the elementary modules are identical, the offset of the posts of one module relative to the posts of a preceding module that faces it being obtained by the mutual spacing of the elementary modules.

13. The device as claimed in claim 1, including means for guiding the cursor carrying the yarn guide, which means keep the magnetized plate in position in the airgap of the stators and opposing the attractive forces between the magnets and the poles of the magnetic circuit.

14. The device as claimed in claim 13, wherein the guiding means are formed by sets of rollers placed on the cursor which rollers run along guides that extend over an entire length of the delivery system.

15. The device as claimed in claim 1, wherein the reversal of the to-and-fro movement of the yarn guide is commanded and controlled by means for detecting the position of the cursor supporting the yarn guide.

16. The device as claimed in claim 15, wherein the means for detecting the position of the cursor are formed by one or more sensors based on a fixed Hall-effect probe placed near the passage for the magnetized plate constituting the moving element that displaces the yarn guide, this probe delivering a signal proportional to the magnetic field.

17. The device as claimed in claim 16, wherein the signal delivered by the probe is processed so as to detect the arrival of the magnetized plate by appearance of a first front and then its displacement, by counting alternations resulting from running of the North and South poles of said magnetized plate.

18. The device as claimed in claim 1, comprising a large number of modules in order to provide a long travel, and wherein only modules that are placed facing the magnetized plate are supplied, other modules being disconnected throughout a time when the magnetic plate is outside of their range, thus allowing them to cool down.

* * * * *